US010033558B2

(12) United States Patent
Yoo et al.

(10) Patent No.: US 10,033,558 B2
(45) Date of Patent: Jul. 24, 2018

(54) INTER-ENB OVER-THE-AIR CALIBRATION FOR RECIPROCITY-BASED COORDINATED MULTIPOINT COMMUNICATIONS

(71) Applicant: QUALCOMM Incorporated, San Diego, CA (US)

(72) Inventors: Taesang Yoo, Riverside, CA (US); Dinkar Vasudevan, New Delhi (IN); Seyedkianoush Hosseini, San Diego, CA (US); Jing Sun, San Diego, CA (US); Xiaoxia Zhang, San Diego, CA (US); Siddhartha Mallik, San Diego, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/442,482

(22) Filed: Feb. 24, 2017

(65) Prior Publication Data

US 2018/0097667 A1    Apr. 5, 2018

Related U.S. Application Data

(60) Provisional application No. 62/403,933, filed on Oct. 4, 2016.

(51) Int. Cl.
*H04W 4/00*    (2018.01)
*H04L 25/03*    (2006.01)
(Continued)

(52) U.S. Cl.
CPC ......... *H04L 25/0398* (2013.01); *H04B 7/024* (2013.01); *H04B 17/11* (2015.01);
(Continued)

(58) Field of Classification Search
None
See application file for complete search history.

(56) References Cited

U.S. PATENT DOCUMENTS

2009/0093222 A1    4/2009  Sarkar
2010/0260060 A1*  10/2010  Abraham .......... H04L 25/03343
                                                                370/252
(Continued)

FOREIGN PATENT DOCUMENTS

WO    WO-2015085510 A1    6/2015
WO    WO-2015188361 A1    12/2015

OTHER PUBLICATIONS

Shi J., et al., "An Efficient Method for Enhancing TDD Over the Air Reciprocity Calibration", IEEE Wireless Communications and Networking Conference, Proceedings, Cancun, Mexico, Mar. 28-31, 2011, pp. 339-344.
(Continued)

*Primary Examiner* — Farah Faroul
(74) *Attorney, Agent, or Firm* — Qualcomm IP Dept.; James Hunt Yancey, Jr.

(57) ABSTRACT

Wireless communications systems and methods related to over-the-air uplink-downlink (UL-DL) reciprocity calibration. A central unit transmits downlink (DL) calibration reference signal (RS) and a calibration request. The central unit receives, in response to the calibration request, a first uplink (UL) calibration RS and a first DL channel estimate associated with a first transmission point (TP) and a first wireless communication device. The central unit transmits a DL coordinated multipoint (CoMP) joint transmission signal according to an uplink-downlink (UL-DL) reciprocity calibration. The UL-DL reciprocity calibration is based on at least a first UL channel estimate based on the first UL calibration RS, the first DL channel estimate, a second UL channel estimate associated with a second TP and the first
(Continued)

wireless communication device, and a second DL channel estimate associated with the second TP and the first wireless communication device.

28 Claims, 20 Drawing Sheets

(51) Int. Cl.
*H04B 17/14* (2015.01)
*H04L 27/34* (2006.01)
*H04L 12/703* (2013.01)
*H04B 7/024* (2017.01)
*H04L 25/02* (2006.01)
*H04B 17/11* (2015.01)
*H04B 17/30* (2015.01)

(52) U.S. Cl.
CPC ............ *H04B 17/14* (2015.01); *H04B 17/30* (2015.01); *H04L 25/0204* (2013.01); *H04L 25/0224* (2013.01); *H04L 25/0242* (2013.01); *H04L 25/03955* (2013.01); *H04L 25/03987* (2013.01); *H04L 27/3488* (2013.01); *H04L 45/28* (2013.01)

(56) References Cited

U.S. PATENT DOCUMENTS

| | | | | |
|---|---|---|---|---|
| 2010/0303015 A1* | 12/2010 | Ko | ........................ | H04B 7/024 370/328 |
| 2012/0314563 A1* | 12/2012 | Luo | ........................ | H04B 17/11 370/216 |
| 2012/0320765 A1* | 12/2012 | Wang | ................. | H04W 56/0035 370/252 |
| 2013/0034010 A1* | 2/2013 | Gao | ........................ | H04L 5/0023 370/252 |
| 2013/0114478 A1* | 5/2013 | Shi | ........................ | H04W 24/08 370/280 |
| 2014/0269502 A1 | 9/2014 | Forenza et al. | | |
| 2015/0172014 A1* | 6/2015 | Zhao | ................... | H04L 25/0204 370/330 |
| 2016/0308624 A1* | 10/2016 | Rong | ..................... | H04B 7/024 |
| 2017/0331604 A1* | 11/2017 | Zirwas | ................. | H04L 5/0048 |

OTHER PUBLICATIONS

Reply to International Search Report and Written Opinion—PCT/US2017/053685—ISA/EPO—dated Feb. 28, 2018.
Alcatel-Lucent Shanghai Bell et al., "Antenna Array Calibration for TDD CoMP", 3GPP Draft; R1-094623, 3rd Generation Partnership Project (3GPP), Mobile Competence Centre; 650, Route Des Lucioles; F-06921 Sophiaantipolis Cedex ; France, No. Jeju; Nov. 9, 2009, Nov. 9, 2009 (Nov. 9, 2009), XP050389032, 6 Pages.
Alcatel-Lucent Shanghai Bell et al., "Simultaneous eNB and UE Reciprocity Calibration", 3GPP Draft; R1-100932_FINAL, 3rd Generation Partnership Project (3GPP), Mobile Competence Centre; 650, Route Des Lucioles; F-06921 Sophiaantipolis Cedex; France, vol. RAN WG 1, No. San Francisco, USA; Feb. 22, 2010, Feb. 16, 2010 (Feb. 16, 2010), XP050418529, 5 Pages.
International Search Report and Written Opinion—PCT/US2017/053685—ISA/EPO—dated Nov. 23, 2017.

* cited by examiner

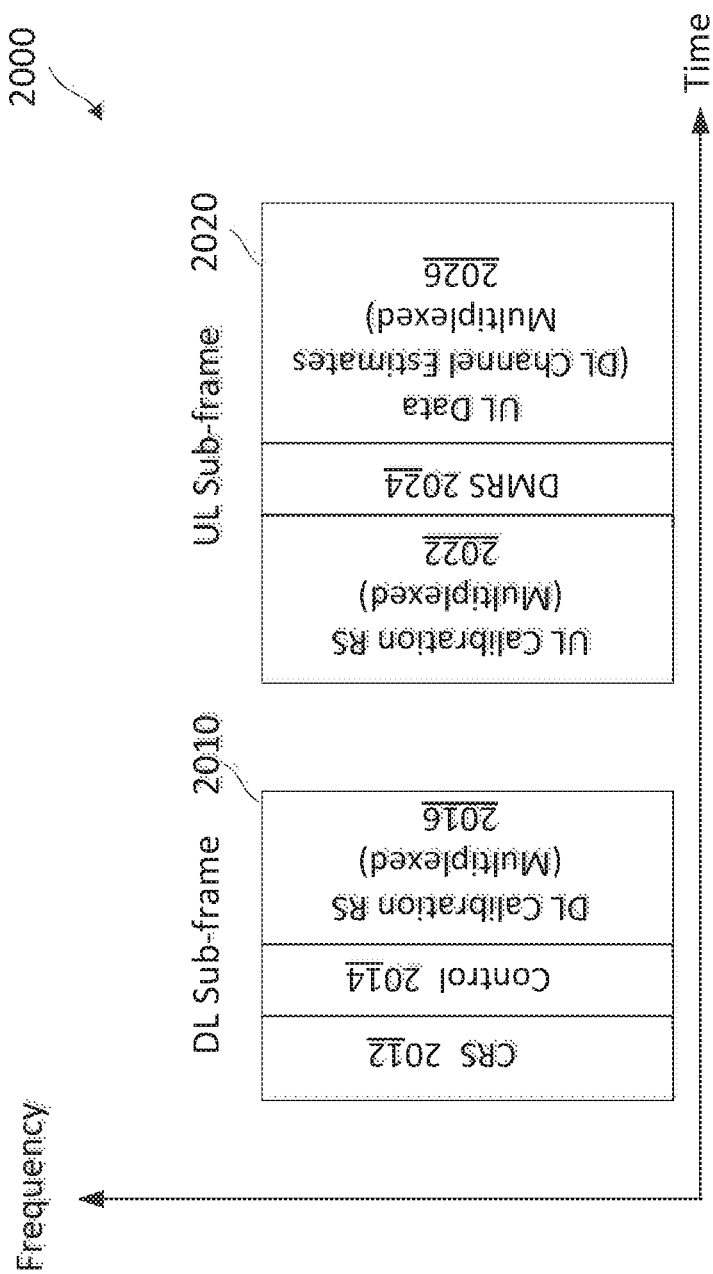

INTER-ENB OVER-THE-AIR CALIBRATION FOR RECIPROCITY-BASED COORDINATED MULTIPOINT COMMUNICATIONS

CROSS REFERENCE TO RELATED APPLICATIONS

The present application claims priority to and the benefit of the U.S. Provisional Patent Application No. 62/403,933, filed Oct. 4, 2016, which is hereby incorporated by reference in its entirety.

TECHNICAL FIELD

This application relates to wireless communication systems, and more particularly to improving coordinated multipoint (CoMP) joint transmission performance by performing inter-evolved Node B (eNB) over-the-air calibration to account for gain and/or phase imbalances between uplink (UL) channels and downlink (DL) channels among eNBs and user equipments (UEs).

INTRODUCTION

A wireless communication network may include a number of base stations (BSs) that can support communication for a number of UEs. In Long Term Evolution (LTE), BSs are referred to as evolved NodeBs (eNBs). In recent years, the carrier frequencies at which BSs and UEs communicate have continued to increase and include larger bandwidths. To take advantage of these higher frequencies, more antennas in the same physical space have been used. For these higher frequency bands to be useful and approximate the same coverage radius as prior technologies (such as 2G, 3G, or 4G), however, more beam forming gain (and more accurate) is becoming necessary.

Conventional systems employ various types of reference signals, with varying fixed structures, to provide sufficient measurements and estimations for adaptive multi-antenna operation in UL and/or DL directions. The UL direction refers to the transmission direction from a UE to a BS. The DL direction refers to the transmission direction from a BS to a UE. For example, a channel state information reference signal (CSIRS) may be used on a DL from the BS to aid the BS in beam form determination, an UL demodulation reference signal (DMRS) specific to each UE may be used to estimate channel information for the UL specifically, and each UE may use a sounding reference signal (SRS) on the UL to aid in scheduling (e.g., determining which frequency bands are good or bad for data).

Reciprocity describes the ability for a station to use information (such as a multipath delay profile) from one channel (e.g., the UL) in making determinations regarding another channel (e.g., the DL). In time-division duplexing (TDD) systems, the physical UL channel and the physical DL channel are identical since UL and DL operate in the same frequency band. For example, BSs may compute UL channel estimates based on SRSs transmitted by UEs and use the UL channel estimates for DL beamforming. However, in practice, a communication channel between a pair of nodes (e.g., a BS and a UE) includes not only the physical channel, but also radio frequency (RF) transceiver chains, for example, including antennas, low-noise amplifiers (LNAs), RF mixers filters, and analog-to-digital (A/D) converters, and in-phase quadrature-phase (I/Q) imbalances, which may be different between different nodes and/or different antennas. Thus, each node can introduce a mismatch, for example, in amplitude and/or phase, to transmitted and/or received signals. The mismatch may impact performance of channel reciprocity-based transmissions.

CoMP is a framework that enables dynamic coordination of transmission and reception over multiple geographically separated, non-collocated eNBs. CoMP includes several coordination techniques such as semi-static coordinated scheduling, transmit beamforming, and interference nulling across multiple network nodes (e.g., UEs). Joint transmission is an example of a CoMP scheme, where several geographically separated eNBs cooperatively create and transmit DL beams such that the receive signal quality and strength at an intended or destined UE is increased while interferences at other UEs caused by the transmission are cancelled or reduced. The creation of DL beams for CoMP joint transmission requires accurate DL channel estimates as seen by the UEs from each cooperative eNB. Reducing or correcting mismatches between UL channels and DL channels allows for effective application of channel reciprocity for CoMP joint transmission.

BRIEF SUMMARY OF SOME EXAMPLES

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

For example, in an aspect of the disclosure, a method of wireless communication includes transmitting, by a central unit, a downlink (DL) calibration reference signal (RS) and a calibration request; receiving, by the central unit in response to the calibration request, a first uplink (UL) calibration RS and a first DL channel estimate associated with a first transmission point (TP) and a first wireless communication device; and transmitting, by the central unit, a DL coordinated multipoint (CoMP) joint transmission signal according to an uplink-downlink (UL-DL) reciprocity calibration, wherein the UL-DL reciprocity calibration is based on at least a first UL channel estimate based on the first UL calibration RS, the first DL channel estimate, a second UL channel estimate associated with a second TP and the first wireless communication device, and a second DL channel estimate associated with the second TP and the first wireless communication device.

In an additional aspect of the disclosure, a method of wireless communication includes receiving, by a user equipment (UE) from a first transmission point (TP), a first downlink (DL) calibration reference signal (RS) and a calibration request; determining, by the UE, a first DL channel estimate based on the first DL calibration RS; transmitting, by the UE to the first TP in response to the calibration request, a first uplink (UL) calibration RS and the first DL channel estimate to facilitate an uplink-downlink (UL-DL) reciprocity calibration; and receiving, by the UE, a DL coordinated multipoint (CoMP) joint transmission signal transmitted according to the UL-DL reciprocity calibration.

In an additional aspect of the disclosure, an apparatus includes a receiver configured to receive a first uplink (UL) calibration reference signal (RS) and a first DL channel estimate associated with a first transmission point (TP) and a first wireless communication device; and a transmitter configured to transmit a downlink (DL) calibration reference signal (RS) and a calibration request, wherein the first UL calibration RS and the first DL channel estimate are received in response to the calibration request; and transmit a DL coordinated multipoint (CoMP) joint transmission signal according to an uplink-downlink (UL-DL) reciprocity calibration, wherein the UL-DL reciprocity calibration is based on at least a first UL channel estimate based on the first UL calibration RS, the first DL channel estimate, a second UL channel estimate associated with a second TP and the first wireless communication device, and a second DL channel estimate associated with the second TP and the first wireless communication device.

In an additional aspect of the disclosure, an apparatus includes a receiver configured to receive, from a first transmission point (TP), a first downlink (DL) calibration reference signal (RS) and a calibration request; and receive a DL coordinated multipoint (CoMP) joint transmission signal transmitted according to an uplink-downlink (UL-DL) reciprocity calibration; a processor configured to determine a first DL channel estimate based on the first DL calibration RS; and a transmitter configured to transmit, to the first TP in response to the calibration request, a first uplink (UL) calibration RS and the first DL channel estimate to facilitate the UL-DL reciprocity calibration.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

BRIEF DESCRIPTION OF THE DRAWINGS

FIG. 20 illustrates a calibration frame structure for exchanging UL and DL calibration RSs in a single shot according to embodiments of the present disclosure.

DETAILED DESCRIPTION

Figure 1:
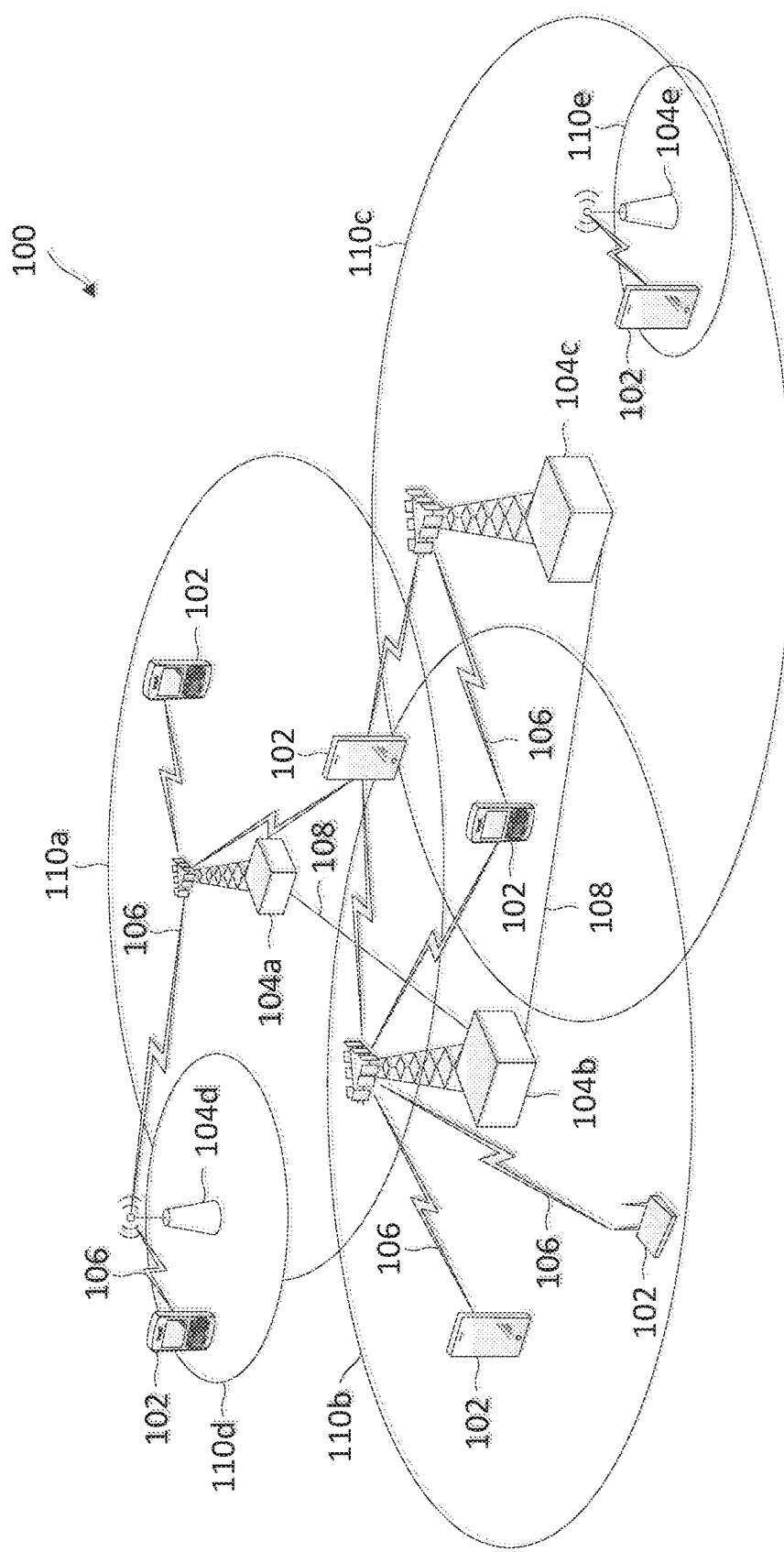
FIG. 1 illustrates a wireless communication network according to embodiments of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as code-division multiple access (CDMA), time-division multiple access (TDMA), frequency-division multiple access (FDMA), orthogonal frequency-division multiple access (OFDMA), single-carrier FDMA (SC-FDMA) and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11

(Wi-Fi), IEEE 802.16 (WiMAX), IEEE 802.20, Flash-OFDMA, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the wireless networks and radio technologies mentioned above as well as other wireless networks and radio technologies, such as a next generation (e.g., $5^{th}$ Generation (5G)) network.

The present disclosure describes over-the-air UL-DL reciprocity calibration across multiple geographically separated eNBs. For example, the eNBs can perform the calibration against one or more UEs. To perform the calibration, the eNBs can transmit DL calibration reference signals (RSs) to the UEs and request the UEs to transmit UL calibration RSs. In response, the UEs can compute DL channel estimates based on the DL calibration RSs and transmit the DL channel estimates and UL calibration RSs to the eNBs. The eNBs can compute UL channel estimates based on the UL calibration RSs. The eNBs can perform the calibration by determining calibration coefficients for adjusting UL channel estimates such that a difference between the DL channel estimates and the UL channel estimates as adjusted by the calibration coefficients is minimized During normal operation, the eNBs can apply the calibration coefficients to UL channel estimates computed from SRSs transmitted by the UEs to beamform data for DL CoMP joint transmission.

FIG. 1 illustrates a wireless communication network 100 according to embodiments of the present disclosure. The network 100 may include a number of UEs 102, as well as a number of BSs 104. The BSs 104 may include an eNodeB. A BS 104 may be a station that communicates with the UEs 102 and may also be referred to as a base transceiver station, a node B, an access point, and the like.

The BSs 104 communicate with the UEs 102 as indicated by communication signals 106. A UE 102 may communicate with the BS 104 via an UL and a DL. The DL (or forward link) refers to the communication link from the BS 104 to the UE 102. The UL (or reverse link) refers to the communication link from the UE 102 to the BS 104. The BSs 104 may also communicate with one another, directly or indirectly, over wired and/or wireless connections, as indicated by communication signals 108.

The UEs 102 may be dispersed throughout the network 100, as shown, and each UE 102 may be stationary or mobile. The UE 102 may also be referred to as a terminal, a mobile station, a subscriber unit, etc. The UE 102 may be a cellular phone, a smartphone, a personal digital assistant, a wireless modem, a laptop computer, a tablet computer, etc. The network 100 is one example of a network to which various aspects of the disclosure apply.

Each BS 104 may provide communication coverage for a particular geographic area. In 3GPP, the term "cell" can refer to this particular geographic coverage area of a BS and/or a BS subsystem serving the coverage area, depending on the context in which the term is used. In this regard, a BS 104 may provide communication coverage for a macro cell, a pico cell, a femto cell, and/or other types of cell. A macro cell generally covers a relatively large geographic area (e.g., several kilometers in radius) and may allow unrestricted access by UEs with service subscriptions with the network provider. A pico cell may generally cover a relatively smaller geographic area and may allow unrestricted access by UEs with service subscriptions with the network provider. A femto cell may also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a pico cell may be referred to as a pico BS. A BS for a femto cell may be referred to as a femto BS or a home BS.

In the example shown in FIG. 1, the BSs 104a, 104b and 104c are examples of macro BSs for the coverage areas 110a, 110b and 110c, respectively. The BSs 104d and 104e are examples of pico and/or femto BSs for the coverage areas 110d and 110e, respectively. As will be recognized, a BS 104 may support one or multiple (e.g., two, three, four, and the like) cells.

The network 100 may also include relay stations. A relay station is a station that receives a transmission of data and/or other information from an upstream station (e.g., a BS, a UE, or the like) and sends a transmission of the data and/or other information to a downstream station (e.g., another UE, another BS, or the like). A relay station may also be a UE that relays transmissions for other UEs. A relay station may also be referred to as a relay BS, a relay UE, a relay, and the like.

The network 100 may support synchronous or asynchronous operation. For synchronous operation, the BSs 104 may have similar frame timing, and transmissions from different BSs 104 may be approximately aligned in time. For asynchronous operation, the BSs 104 may have different frame timing, and transmissions from different BSs 104 may not be aligned in time.

In some implementations, the network 100 utilizes orthogonal frequency division multiplexing (OFDM) on the DL and single-carrier frequency division multiplexing (SC-FDM) on the UL. OFDM and SC-FDM partition the system bandwidth into multiple (K) orthogonal subcarriers, which are also commonly referred to as tones, bins, or the like. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, K may be equal to 72, 180, 300, 600, 900, and 1200 for a corresponding system bandwidth of 1.4, 3, 5, 10, 15, or 20 megahertz (MHz), respectively. The system bandwidth may also be partitioned into sub-bands. For example, a sub-band may cover 1.08 MHz, and there may be 1, 2, 4, 8 or 16 sub-bands for a corresponding system bandwidth of 1.4, 3, 5, 10, 15, or 20 MHz, respectively.

In an embodiment, the BSs 104 can broadcast system information associated with the network 100. Some examples of system information may include physical layer information such as cell bandwidths and frame configurations, cell access information, and neighbor cell information. A UE 102 can access the network 100 by listening to the broadcast system information and requests connection or channel establishments with a BS 104. For example, the UE 102 can perform random access procedures to begin communication with the BS 104 and subsequently perform registration and/or connection procedures to register with the BS 104. After establishing the connection, the UE 102 and the BS 104 can enter a normal operation stage, where operational data may be exchanged.

In an embodiment, the network 100 can be a LTE network. In such an embodiment, the BSs 104 can assign or schedule transmission resources (e.g., in the form of time-frequency resource blocks) for DL and UL transmissions in the network 100. The communication can be in the form of radio frames. A radio frame may include a plurality of DL and UL subframe periods for DL and UL transmissions, respectively. The DL and UL subframe periods can be shared among the BSs 104 and the UEs 102, respectively. The DL subframe periods and the UL subframe periods can be further divided into several regions. For example, each DL or UL subframe period may have pre-defined regions for transmissions of reference signals, control information, and data. Control information may include resource assignments and protocol controls. Data may include protocol data and/or operational data. In some embodiments, the BSs 104 can coordinate with each other to cooperatively schedule, beamform, and/or transmit data in the network 100.

Reference signals are pre-determined signals that facilitate the communications between the BSs 104 and the UEs 102. For example, a reference signal can have a particular pilot pattern or structure, where pilot tones may span across an operational bandwidth or frequency band, each positioned at a pre-defined time and a pre-defined frequency. Thus, the BSs 104 can transmit DL reference signals and the UEs 102 can estimate DL channel states. Similarly, the UEs 102 can transmit UL reference signals and the BSs 104 can estimate UL channel states. The UEs 102 can subsequently recover DL data carried in DL signals transmitted by the BSs 104 based on the DL channel estimates. Similarly, the BSs 104 can subsequently recover UL data carried in UL signals transmitted by the UEs 102 based on the UL channel estimates. In addition, the BSs 104 can derive or determine DL channel information from corresponding UL channel estimates based on channel reciprocity to perform scheduling and/or beamforming.

Figure 2:
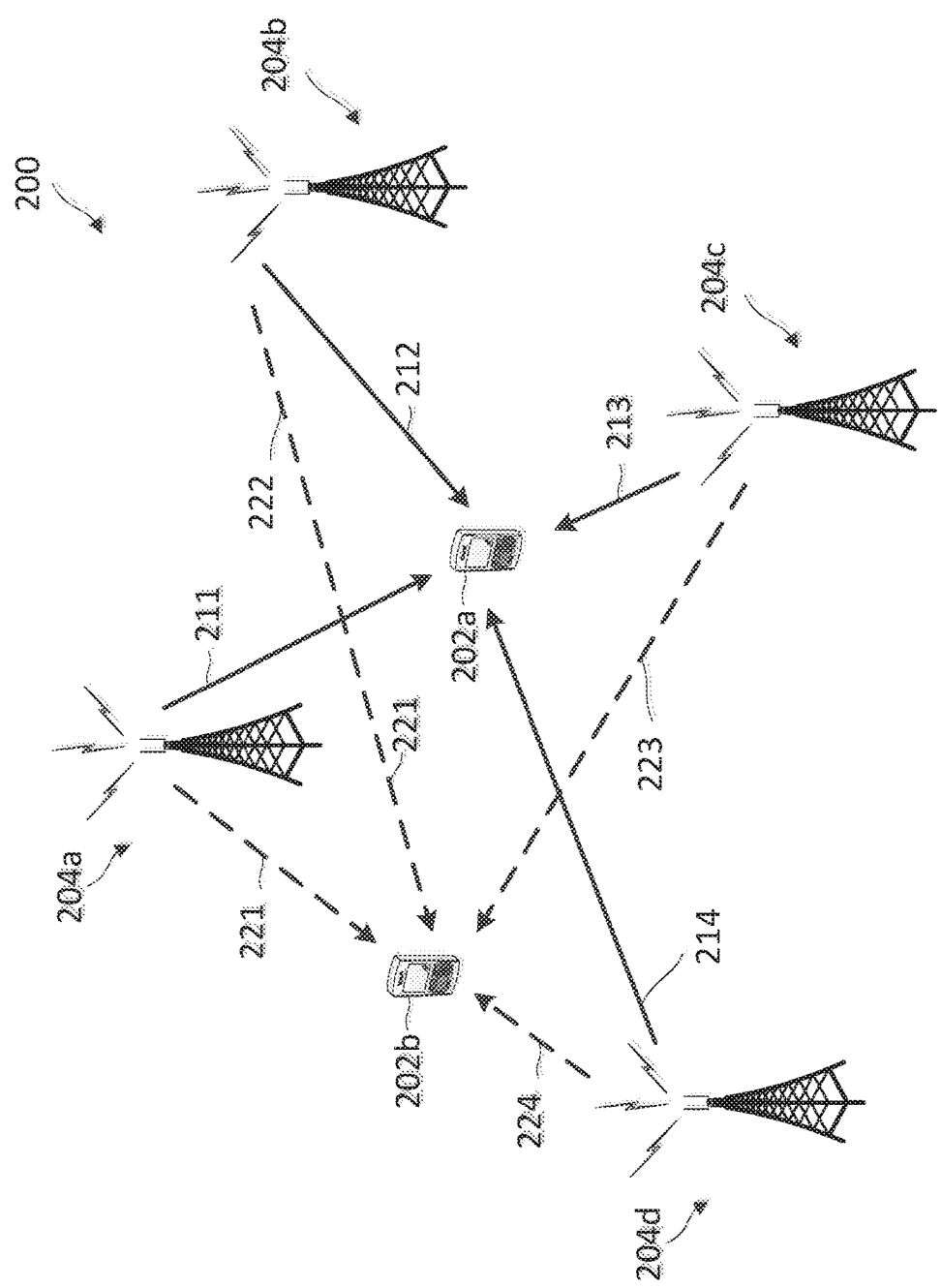
FIG. 2 illustrates a wireless communication network that performs downlink (DL) coordinated multipoint (CoMP) joint transmission according to embodiments of the present disclosure.

FIG. 2 illustrates a wireless communication network 200 that performs DL CoMP joint transmission according to embodiments of the present disclosure. The network 200 corresponds to a portion of the network 100. FIG. 2 illustrates four geographically separated BSs 204 and two UEs 202 for purposes of simplicity of discussion, though it will be recognized that embodiments of the present disclosure may scale to many more UEs 202 and/or BSs 204. The BSs 204 correspond to the BSs 104. The UEs 202 correspond to the UEs 102. The UEs 202 and the BSs 204 may communicate with each other at any suitable frequencies.

In FIG. 2, the UE 202a is a scheduled or target UE for data transmission and the UE 202b is another UE located within a coverage area of the BSs 204a, 204b, 204c, and 204d. The BSs 204a, 204b, 204c, and 204d cooperatively and simultaneously transmit a signal intended to the UE 202a. The signal is transmitted from the BSs 204a-204d with beamforming weights, creating a beam. The beamformed signal is transmitted over the air, and, by the broadcast nature of the wireless medium, received at all the UEs (e.g., the UE 202a and 202b) in the coverage area of the BSs 204a-204d. The channels from the BSs 204a-204d to the UE 202a are denoted as 211, 212, 213, and 214, respectively. The channels from the BSs 204a-204d to the UE 202b are denoted as 221, 222, 223, and 224, respectively. The channels 211-214 are represented by solid arrows. The channels 221-224 are represented by dashed arrows. The BSs 204 can cooperatively perform beamforming to create a beam direction for the transmitted signal such that the signal is received at the intended UE 202a via the channel 211-214 with high signal quality and power and at the same time received at the UE 202b via the channel 221-224 or other UEs with interference nulling. Interference nulling refers to the beamform strategy such that the received interference from each BS, when combined over BSs, sums up to zero, so that no interference is seen at unintended UEs 202b.

The DL transmission channels among N cooperating BSs 204 simultaneously serving M UEs 202 can be represented by a channel matrix $H_{joint}$ as shown below:

$$H_{joint} = \begin{bmatrix} H_{1,1} & H_{1,2} & \cdots & H_{1,N} \\ \vdots & \vdots & \ddots & \vdots \\ H_{u,1} & H_{u,2} & \cdots & H_{u,N} \\ \vdots & \vdots & \ddots & \vdots \\ H_{M,1} & \vdots & \cdots & H_{M,N} \end{bmatrix}, \quad (1)$$

where $H_{i,j}$ represents a transmission channel between an $i^{th}$ UE and a $j^{th}$ BS and the index u represents a target UE (e.g., UE 202a). In the example of FIG. 2, N is 4 and M is 2.

To beamform data for CoMP joint transmission, the BSs 204 may cooperatively create the beam such that the ratio of the signal power at the target UE 202a to the interference power at all the other UEs is maximized. The ratio may be referred to as a signal-to-leakage ratio (SLR). The SLR is expressed as shown below:

$$W_{:,u} = \mathrm{argmax}_{\|\omega\|^2 = P_s} \frac{|H_{u,:} \times \omega|^2}{1 + \sum_{i \neq u} |H_{i,:} \times \omega|^2}, \quad (2)$$

where $W_{:,u}$ represents the SINR at the $u^{th}$ UE 202 and $\omega$ represents a beamform vector constrained by a maximum transmit power $P_s$. Thus, the term $|H_{u,:} \times \omega|^2$ represents the received power of the joint transmission at the $u^{th}$ UE 202 and the term $\Sigma_{i \neq u} |H_{i,:} \times \omega|^2$ represents the interference at other UEs 202 excluding the $u^{th}$ UE 202 caused by the joint transmission.

Although FIG. 2 is described with the UE 202a as the target UE, the network BS 204 can simultaneously transmit multiple beams intended for different UEs. For example, the UE 202b can be a target UE for a second beam, where the BSs 204 may simultaneously transmit the second beam for the UE 202b and the first beam for the UE 202a. The BSs 204 can create the second beam direction to increase signal quality at the UE 202b and cancel out interference at the UE 202a.

In an embodiment, the BSs 204 employ a channel reciprocity scheme to determine the channel matrix $H_{joint}$. The UEs 202 send SRSs and each BS 204 determines a UL channel estimate for each UE 202 based on a corresponding received SRS. In the channel reciprocity scheme, the BSs 204 uses the UL channel estimates for the DL channel estimates $H_{i,j}$ to beamform the signals. As described above, the channel reciprocity property may be imperfect due to a mismatch between the RF transceiver chains of the BSs 204 and the UEs 202. Thus, the joint transmission performance may be degraded by the mismatch, for example, inference may not be completely cancelled at the unintended UE.

Figure 3:
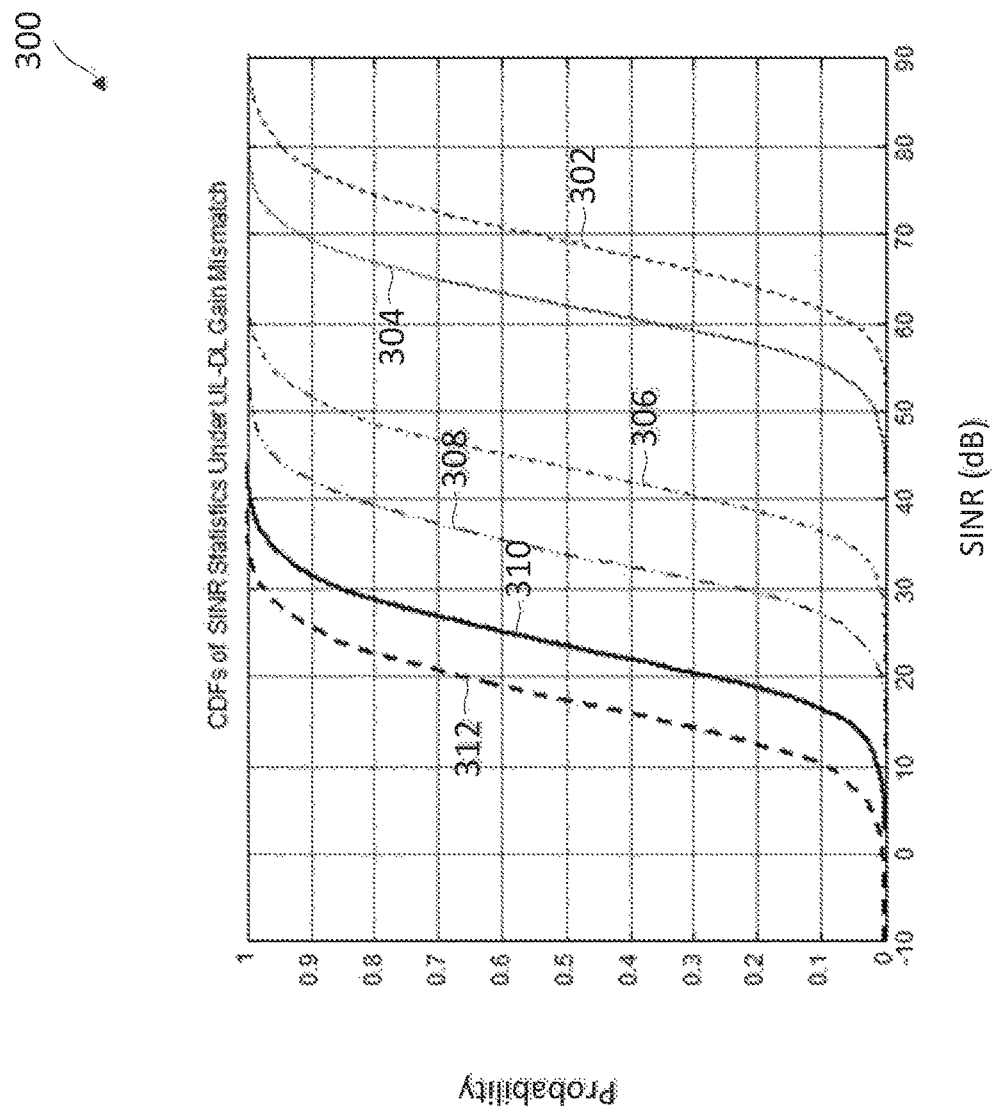
FIG. 3 is a graph illustrating the impact of uplink-downlink (UL-DL) gain mismatch on joint transmission performance

FIG. 3 is a graph 300 illustrating the impact of UL-DL gain mismatch on joint transmission performance according to embodiments of the present disclosure. The x-axis represents SINRs in units of decibel (dB). The y-axis represents probabilities. The curves 302, 304, 306, 308, 310, and 312 show cumulative distribution functions (CDFs) of the SINR statistics with increasing gain mismatches of 0 dB, 0.01 dB, 0.1 dB, 0.3 dB, 1 dB, and 2 dB, respectively. As shown in the curve 302, about 50 percent (%) of the UEs experience SINRs at about 70 dB in joint transmission when there is no gain mismatch. Conversely, as shown in the curve 312, about 50 percent (%) of the UEs experience SINRs at about 10-15 dB when the gain mismatch is about 2 dB.

Figure 4:
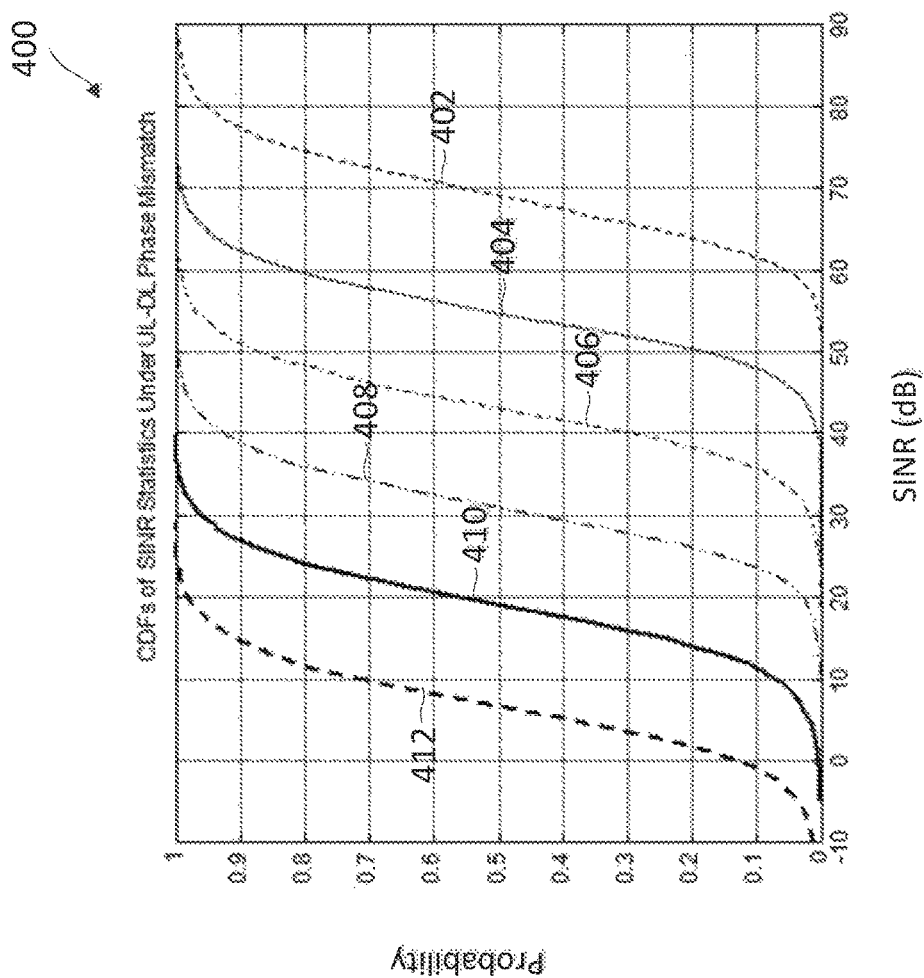
FIG. 4 is a graph illustrating the impact of UL-DL phase mismatch on joint transmission performance.

FIG. 4 is a graph 400 illustrating the impact of UL-DL phase mismatch on joint transmission performance according to embodiments of the present disclosure. The x-axis represents SINRs in units of dB. The y-axis represents probabilities. The curves 402, 404, 406, 408, 410, and 412 show cumulative distribution functions (CDFs) of the SINR statistics with increasing phase mismatches of 0 radian, pi/1024 radian, pi/256 radian, pi/64 radian, pi/16 radian, and pi/4 radian. As shown in the curve 302, about 50 percent (%) of the UEs experience SINRs at about 65-70 dB in joint transmission when there is no phase mismatch. Conversely, as shown in the curve 316, about 50 percent (%) of the UEs experience SINRs at about 5-10 dB when the phase mismatch is about pi/4 radian.

As can be seen from the graphs 300 and 400, gain and/or phase mismatches can degrade joint transmission performance. As such, calibrating gain and/or phase differences between RF transceivers of BSs such as the BSs 104 and 204 and UEs such as the UEs 102 and 202 can improve the performance of CoMP joint transmission. In non-CoMP devices, RF calibration can be performed across antennas within the devices. In contrast, calibration for CoMP needs to be performed across cooperative devices. The present disclosure provides an over-the-air calibration scheme for reciprocity-based CoMP, where calibration is performed across all antennas of cooperating nodes.

Figure 5:
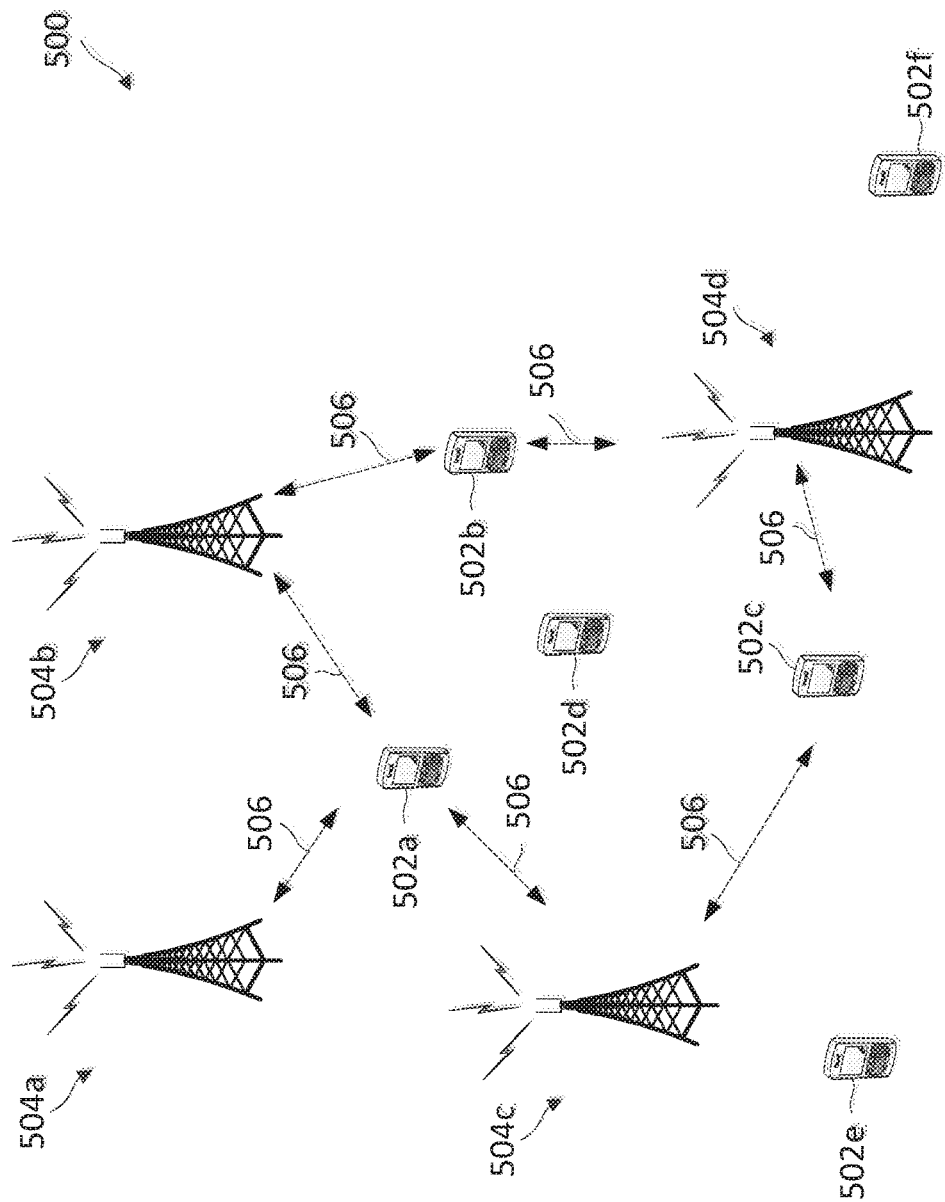
FIG. 5 illustrates a wireless communication network that performs over-the-air UL-DL reciprocity calibration according to embodiments of the present disclosure.

FIG. 5 illustrates a wireless communication network 500 which performs over-the-air UL-DL reciprocity calibration according to embodiments of the present disclosure. The network 500 is similar to the networks 100 and 200. The network 500 may include a plurality of BSs 504 similar to the BSs 104 and 204 in communication with a plurality of UEs 502 similar to the UEs 102 and 202. The BSs 504a, 504b, 504c, and 504d are geographically dispersed, cooperative BSs that cooperatively serve the UEs 502. For example, the BSs 504 perform similar CoMP joint transmission as the BSs 204 by simultaneously sending the same data to a scheduled UE 502 with appropriate beamforming. To improve the joint transmission performance, the BSs 504 perform over-the-air UL-DL reciprocity calibration by measuring imbalances between UL channels and DL channels and determining calibration adjustment based on the measured mismatch. For example, the BSs 504 can perform the calibration in a calibration phase prior to sending data to the UEs 502 and can repeat the calibration in some periods.

To begin the calibration, the BSs 504 can select one or more anchoring UEs 502a, 502b, 502c, 502d, 502e, and 502f for over-the-air calibration. For example, a UE 502 that has high link signal-to-noise ratios (SNRs) to the BSs 504 can be selected. As an example, the links 506 between the UEs 502a, 502b, and 502c and the BSs 504 have high SNRs. Thus, the BSs 504 select the UEs 502a, 502b, and 502c. Each BS 504 can transmit a DL calibration reference signal (RS) to each UE 502 so that each UE 502 can estimate the DL channel from each of the BS 504 to the UE 502. The DL calibration RS is a pre-determined signal, for example, including a pre-defined pattern of pilot tones distributed across an operational frequency band in use by the BSs 504 and the UEs 502. Similarly, each UE 502 can transmit a UL calibration RS to each BS 504 so that each BS 504 can estimate the UL channel from the UE to each BS 504. Alternatively, each UE 502 can broadcast the UL calibration RS to all BSs 504. The UL calibration RS is a pre-determined signal, for example, including a pre-defined pattern of pilot tones distributed across the operational frequency band in use by the BSs 504 and the UEs 502. The DL calibration RS and the UL calibration RS can be the same or different. In addition, each UE 502 can transmit the DL channel estimates to corresponding BSs 504. Thus, the BSs 504 can determine calibration coefficients to account for mismatches between the UL channel estimates and the DL channel estimates.

Subsequently, during normal data operation, the BSs 504 can receive SRSs from the UEs 502 and determine UL channel estimates based on the received SRSs. The BSs 504 can apply the calibration coefficients to the UL channel estimates obtained from the SRSs when determining beamforming weights for DL CoMP joint transmission. The UE selection, the calibration algorithm, and the transmission scheme are described in greater detail herein. It should be noted that the over-the-air calibration can be performed by any suitable number of cooperative BSs 504 against any suitable number of anchoring UEs 502.

Figure 6:
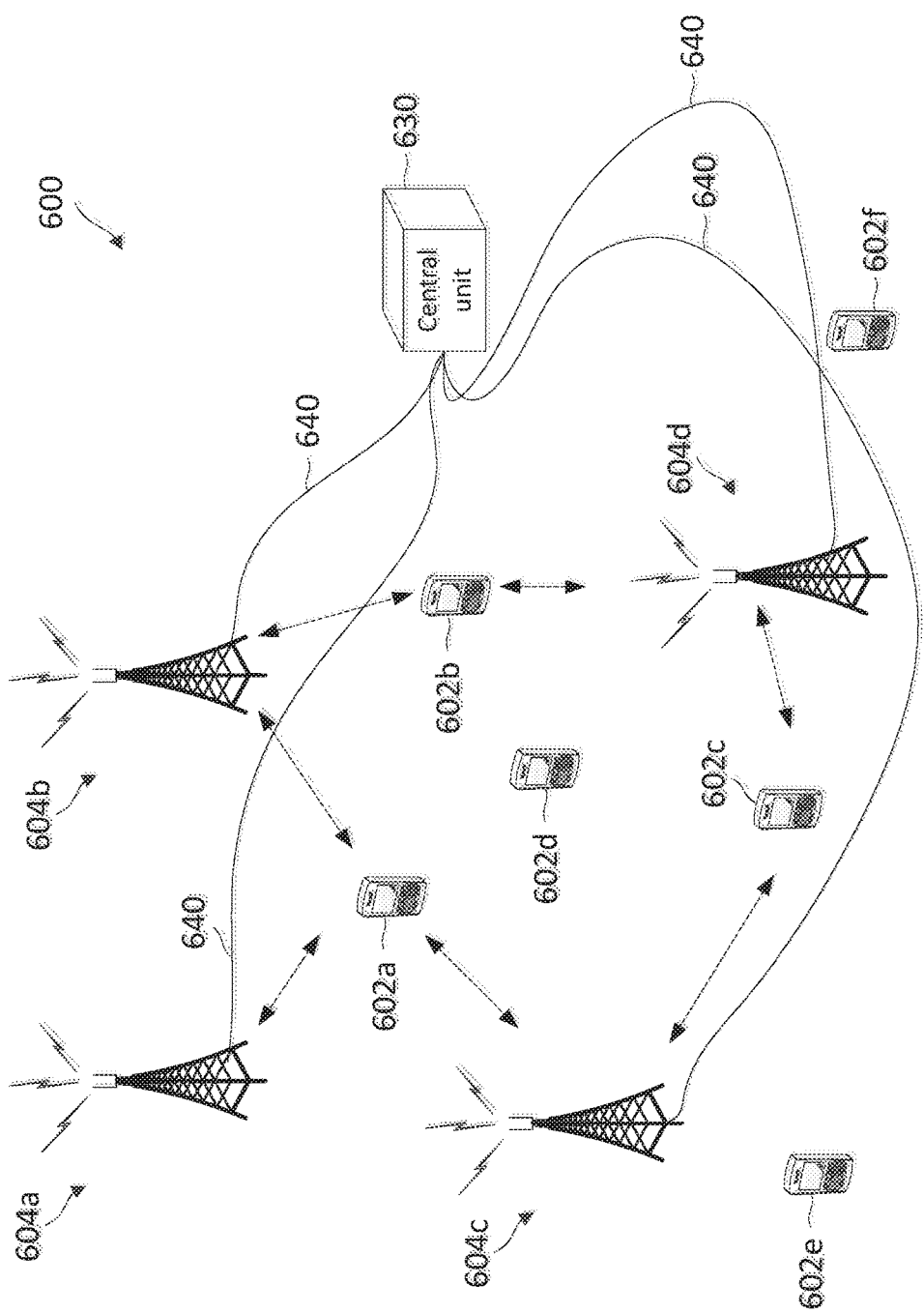
FIG. 6 illustrates a wireless communication network that performs over-the-air UL-DL reciprocity calibration according to embodiments of the present disclosure.

FIG. 6 illustrates a wireless communication network 600 which performs over-the-air UL-DL reciprocity calibration according to embodiments of the present disclosure. The network 600 is similar to the network 100, 200, and 500. However, the network 600 employs a plurality of transmission points (TPs) 604 in place of the BSs 504. The TPs 604 are distributed antennas with RF capabilities, but may not perform baseband processing and controls as in the BSs 504. Baseband processing may include modulation, demodulation, encoding, decoding, and CoMP beam computation. Controls may include scheduling and protocol-related operations. The TPs 604 are coupled to a central unit 630 via a plurality of links 640 and the baseband processing and the controls are relocated to the central unit 630. The links 640 may include high-speed optical fiber links or any suitable links. In a DL direction, the central unit 630 may transmit modulated symbols or samples to the TPs 604 for DL transmission to the UE 602. In a UL direction, the TPs 604 receives UL signals from the UE 602 and forwards the UL signals (e.g., carrying digital samples) to the central unit 630.

To perform UL-DL reciprocity calibration, the UEs 602 perform the same operations such as transmissions of UL calibration RS and computations of DL channel estimates as the UEs 502. The TPs 604 function as RF transmitters and receivers and perform similar transmissions of DL calibration RSs and receptions of the UL calibration RSs and the DL channel estimates as the BSs 504. The central unit 630 generates the DL calibration RSs and forwards the DL calibration RSs to the TPs 604 and the TPs 604 forwards the received UL calibration RSs and DL channel estimates to the central unit 630. The central unit 630 performs similar calibration as the BSs 504. As shown, the central unit 630 selected the UEs 602a, 602b, and 602c for the calibration with the TPs 604a, 604b, 604c, and 604d. Although FIG. 6 illustrates the central unit 630 located at a remote location from the TPs 604, in some embodiments, the central unit 630 may be collocated with one of the TPs 604. In addition, some networks may include a combination of TPs such as the TPs 604, a central unit such as the central unit 630, and BSs such as the BSs 504, and UEs such as the UEs 502 and 602. In such networks, the central unit, and the BSs may apply the same calibration mechanisms against the UEs as described above.

Figure 7:
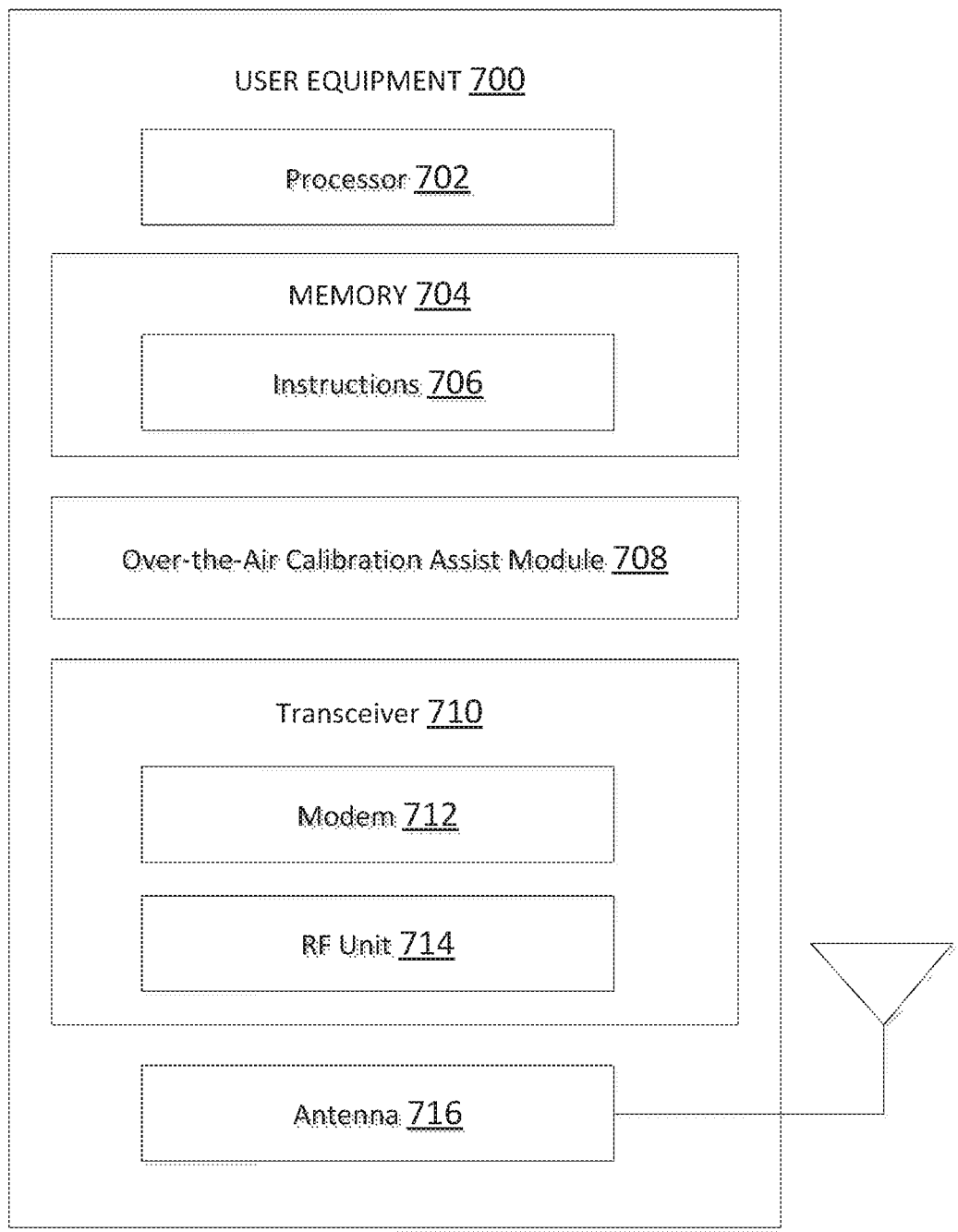
FIG. 7 is a block diagram of a user equipment (UE) according to embodiments of the present disclosure.

FIG. 7 is a block diagram of a UE 700 according to embodiments of the present disclosure. The UE 700 may be a UE 102, 202, 502, or 602 as discussed above. As shown, the UE 700 may include a processor 702, a memory 704, an over-the-air calibration assist module 708, a transceiver 710 including a modem subsystem 712 and a RF unit 714, and an antenna 716. These elements may be in direct or indirect communication with each other, for example via one or more buses.

The processor 702 may include a central processing unit (CPU), a digital signal processor (DSP), an application-specific integrated circuit (ASIC), a controller, a field programmable gate array (FPGA) device, another hardware device, a firmware device, or any combination thereof configured to perform the operations described herein. The processor 702 may also be implemented as a combination of computing devices, e.g., a combination of a DSP and a microprocessor, a plurality of microprocessors, one or more microprocessors in conjunction with a DSP core, or any other such configuration.

The memory 704 may include a cache memory (e.g., a cache memory of the processor 702), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an embodiment, the memory 704 includes a non-transitory computer-readable medium. The memory 704 may store instructions 706. The instructions 706 may include instructions that, when executed by the processor 702, cause the processor 702 to perform the operations described herein with reference to the UEs 102 in connection with embodiments of the present disclosure. Instructions 706 may also be referred to as code. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The over-the-air calibration assist module 708 may be used for various aspects of the present disclosure. For example, the over-the-air calibration assist module 708 is configured to generate UL calibration RSs and compute DL channel estimates to assist calibration at the BSs 104, 204, and 504 or the central unit 630, as described in greater detail herein.

As shown, the transceiver 710 may include the modem subsystem 712 and the RF unit 714. The transceiver 710 can be configured to communicate bi-directionally with other devices, such as the BSs 104, 204, and 504 and the TPs 604. The modem subsystem 712 may be configured to modulate and/or encode the data from the memory 704 and/or the over-the-air calibration assist module 708 according to a modulation and coding scheme (MCS), e.g., a low-density parity check (LDPC) coding scheme, a turbo coding scheme, a convolutional coding scheme, etc. The RF unit 714 may be configured to process (e.g., perform analog to digital conversion or digital to analog conversion, etc.) modulated/encoded data from the modem subsystem 712 (on outbound transmissions) or of transmissions originating from another source such as a UE 102 or a BS 104. Although shown as integrated together in transceiver 710, the modem subsystem 712 and the RF unit 714 may be separate devices that are coupled together at the UE 102 to enable the UE 102 to communicate with other devices.

The RF unit 714 may provide the modulated and/or processed data, e.g. data packets (or, more generally, data messages that may contain one or more data packets and other information), to the antenna 716 for transmission to one or more other devices. This may include, for example, transmission of a UL calibration RS or a DL channel estimate according to embodiments of the present disclosure. The antenna 716 may further receive data messages transmitted from other devices. This may include, for example, reception of a DL calibration RS and a calibration request according to embodiments of the present disclosure. The antenna 716 may provide the received data messages for processing and/or demodulation at the transceiver 710. Although FIG. 7 illustrates antenna 716 as a single antenna, antenna 716 may include multiple antennas of similar or different designs in order to sustain multiple transmission links.

Figure 8:
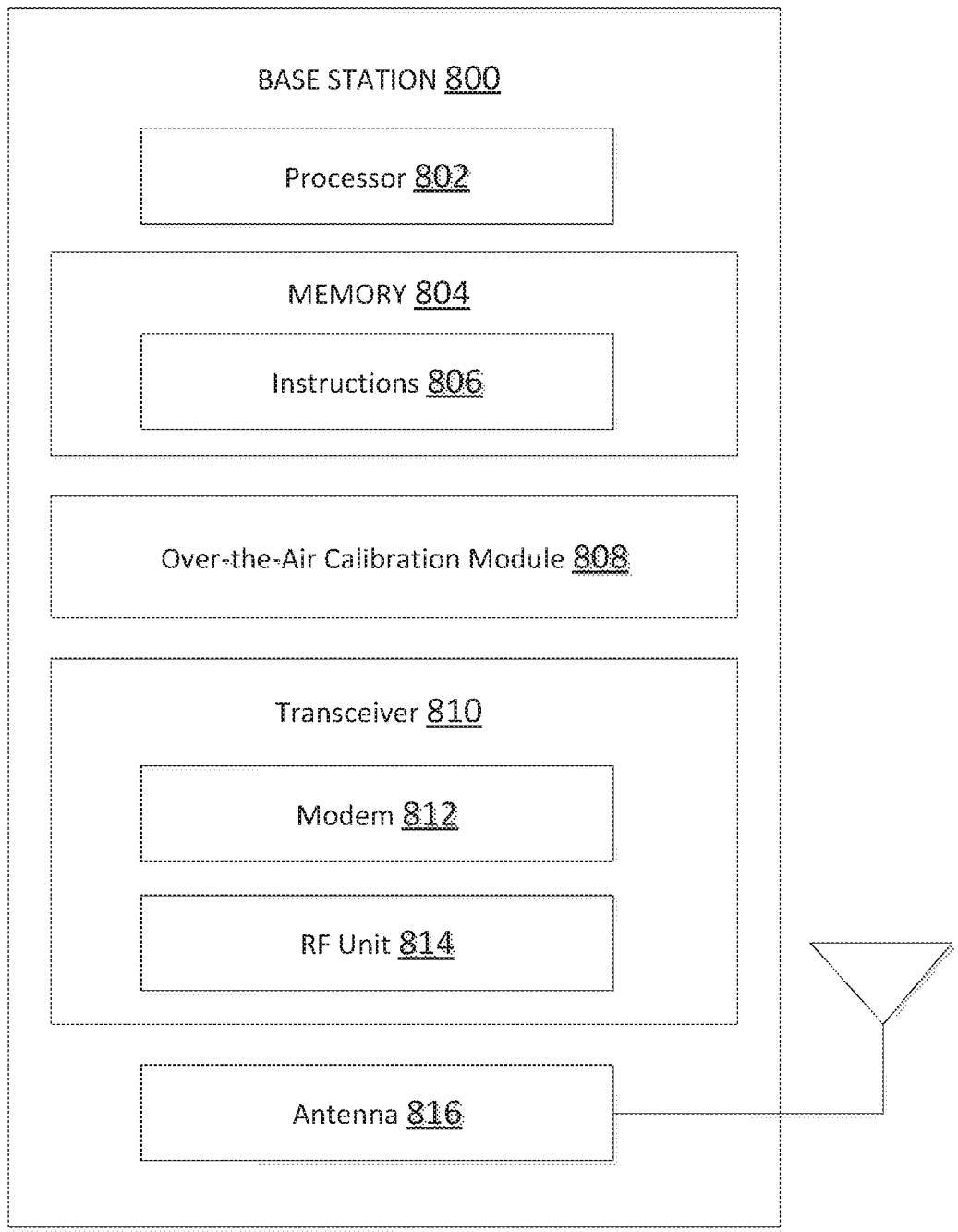
FIG. 8 illustrates a block diagram of a base station (BS) according to embodiments of the present disclosure.

FIG. 8 illustrates a block diagram of an exemplary BS 800 according to embodiments of the present disclosure. The BS 800 may be a BS 104, 104, 504, or 605 as discussed above. A shown, the BS 800 may include a processor 802, a memory 804, an over-the-air calibration module 808, a transceiver 810 including a modem subsystem 812 and a RF unit 814, and an antenna 816. These elements may be in direct or indirect communication with each other, for example via one or more buses.

The processor 802 may have various features as a specific-type processor. For example, these may include a CPU, a DSP, an ASIC, a controller, a FPGA device, another hardware device, a firmware device, or any combination thereof configured to perform the operations described herein. The processor 802 may also be implemented as a combination of computing devices, e.g., a combination of a DSP and a microprocessor, a plurality of microprocessors, one or more microprocessors in conjunction with a DSP core, or any other such configuration.

The memory 804 may include a cache memory (e.g., a cache memory of the processor 802), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some embodiments, the memory 804 may include a non-transitory computer-readable medium. The memory 804 may store instructions 806. The instructions 806 may include instructions that, when executed by the processor 802, cause the processor 802 to perform operations described herein. Instructions 806 may also be referred to as code, which may be interpreted broadly to include any type of computer-readable statement(s) as discussed above with respect to FIG. 7.

The over-the-air calibration module 808 may be used for various aspects of the present disclosure. For example, the over-the-air calibration module 808 may generate DL calibration RSs, compute UL channel estimates, determine calibration coefficients, and apply the calibration coefficients to UL channel estimates computed based on SRSs for DL CoMP transmission. In some embodiments, the over-the-air calibration module 808 may store the computed calibration coefficients in the memory 804 for subsequent application to the SRSs.

As shown, the transceiver 810 may include the modem subsystem 812 and the RF unit 814. The transceiver 810 can be configured to communicate bi-directionally with other devices, such as the UEs 102, 202, 502, and 602 and/or another core network element. The modem subsystem 812 may be configured to modulate and/or encode data according to a MCS, e.g., a LDPC coding scheme, a turbo coding scheme, a convolutional coding scheme, etc. The RF unit 814 may be configured to process (e.g., perform analog to digital conversion or digital to analog conversion, etc.) modulated/encoded data from the modem subsystem 812 (on outbound transmissions) or of transmissions originating from another source such as a UE 102. Although shown as integrated together in transceiver 810, the modem subsystem 812 and the RF unit 814 may be separate devices that are coupled together at the BS 104 to enable the BS 104 to communicate with other devices.

The RF unit 814 may provide the modulated and/or processed data, e.g. data packets (or, more generally, data messages that may contain one or more data packets and other information), to the antenna 816 for transmission to one or more other devices. This may include, for example, transmission of information to complete attachment to a network and communication with a camped UE 102 according to embodiments of the present disclosure. The antenna 816 may further receive data messages transmitted from other devices and provide the received data messages for processing and/or demodulation at the transceiver 810. Although FIG. 8 illustrates antenna 816 as a single antenna, antenna 816 may include multiple antennas of similar or different designs in order to sustain multiple transmission links.

Figure 9:
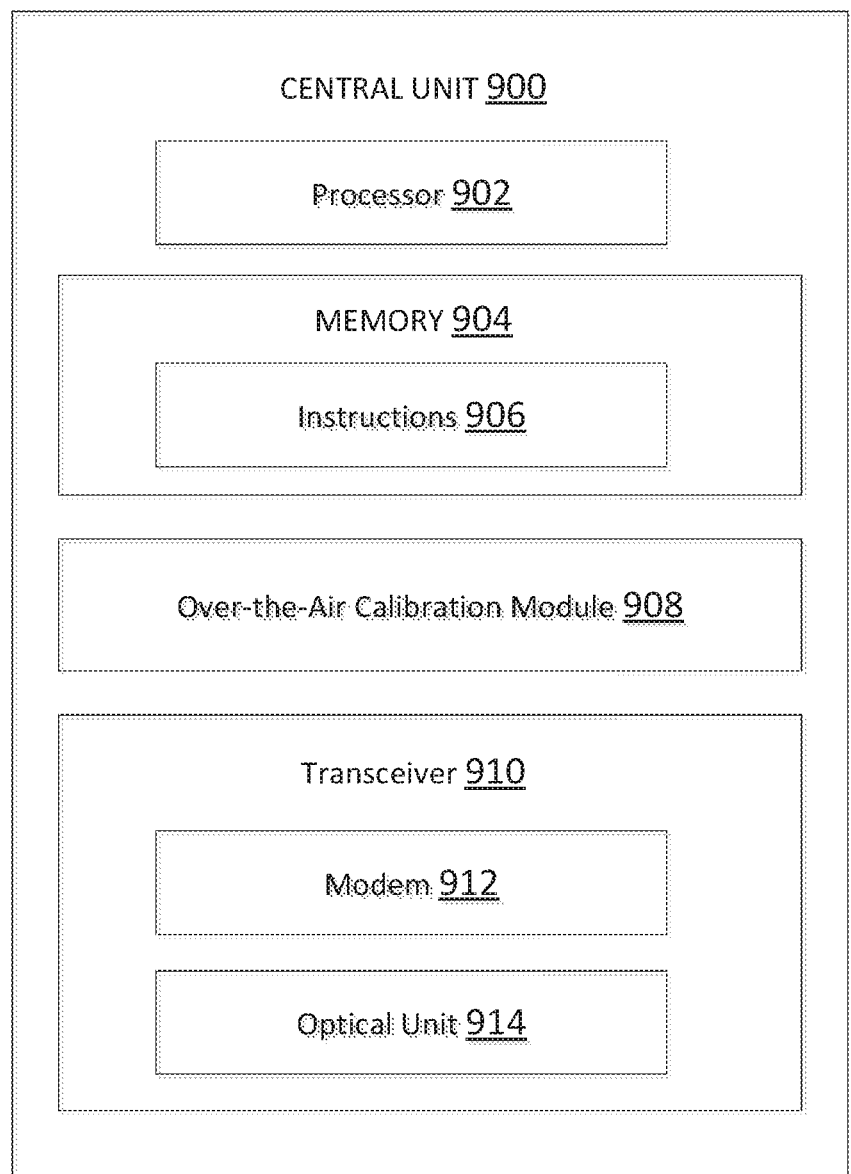
FIG. 9 illustrates a block diagram of a central unit according to embodiments of the present disclosure.

FIG. 9 illustrates a block diagram of an exemplary central unit 900 according to embodiments of the present disclosure. The central unit 900 may be a central unit 630 as discussed above. A shown, the central unit 900 may include a processor 902, a memory 904, an over-the-air calibration module 908, and a transceiver 910 including a modem subsystem 912 and an optical unit 914. These elements may be in direct or indirect communication with each other, for example via one or more buses.

The processor 902 may have various features as a specific-type processor. For example, these may include a CPU, a DSP, an ASIC, a controller, a FPGA device, another hardware device, a firmware device, or any combination thereof configured to perform the operations described herein. The processor 902 may also be implemented as a combination of computing devices, e.g., a combination of a DSP and a microprocessor, a plurality of microprocessors, one or more microprocessors in conjunction with a DSP core, or any other such configuration.

The memory 904 may include a cache memory (e.g., a cache memory of the processor 902), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some embodiments, the memory 904 may include a non-transitory computer-readable medium. The memory 904 may store instructions 906. The instructions 906 may include instructions that, when executed by the processor 902, cause the processor 902 to perform operations described herein. Instructions 906 may also be referred to as code, which may be interpreted broadly to include any type of computer-readable statement(s) as discussed above with respect to FIG. 7.

The over-the-air calibration module 908 may be used for various aspects of the present disclosure. For example, the over-the-air calibration module 908 may generate DL calibration RSs, compute UL channel estimates, determine calibration coefficients, and apply the calibration coefficients to UL channel estimates computed based on SRSs for DL CoMP transmission. In some embodiments, the over-the-air calibration module 908 may store the computed calibration coefficients in the memory 904 for subsequent application to the SRSs.

As shown, the transceiver 910 may include the modem subsystem 912 and the optical unit 914. The transceiver 910 can be configured to communicate bi-directionally with other devices, such as the TPs 604 and/or another core network element. The modem subsystem 912 may be configured to modulate and/or encode data according to a MCS, e.g., a LDPC coding scheme, a turbo coding scheme, a convolutional coding scheme, etc. The optical unit 914 may include electrical-to-optical (E/O) components and/or optical-to-electrical (O/E) components that convert an electrical signal to an optical signal for transmission to a TP such as the TPs 604 and/or receive an optical signal from the TP and convert the optical signal into an electrical signal, respectively. The optical unit 914 may be configured to process (e.g., perform analog to digital conversion or digital to analog conversion, optical to electrical conversion or electrical to optical conversion, etc.) modulated/encoded data from the modem subsystem 912 (on outbound transmissions) or of transmissions originating from another source such as a backend or core network. Although shown as integrated together in transceiver 910, the modem subsystem 912 and the optical unit 914 may be separate devices that are coupled together at the central unit 900 to enable the central unit 900 to communicate with other devices. The optical unit 914 may transmit optical signal carrying the modulated and/or processed data over an optical link such as the links 640. The optical unit 914 may further receive optical signals carrying data messages and provide the received data messages for processing and/or demodulation at the transceiver 910.

Figure 10:
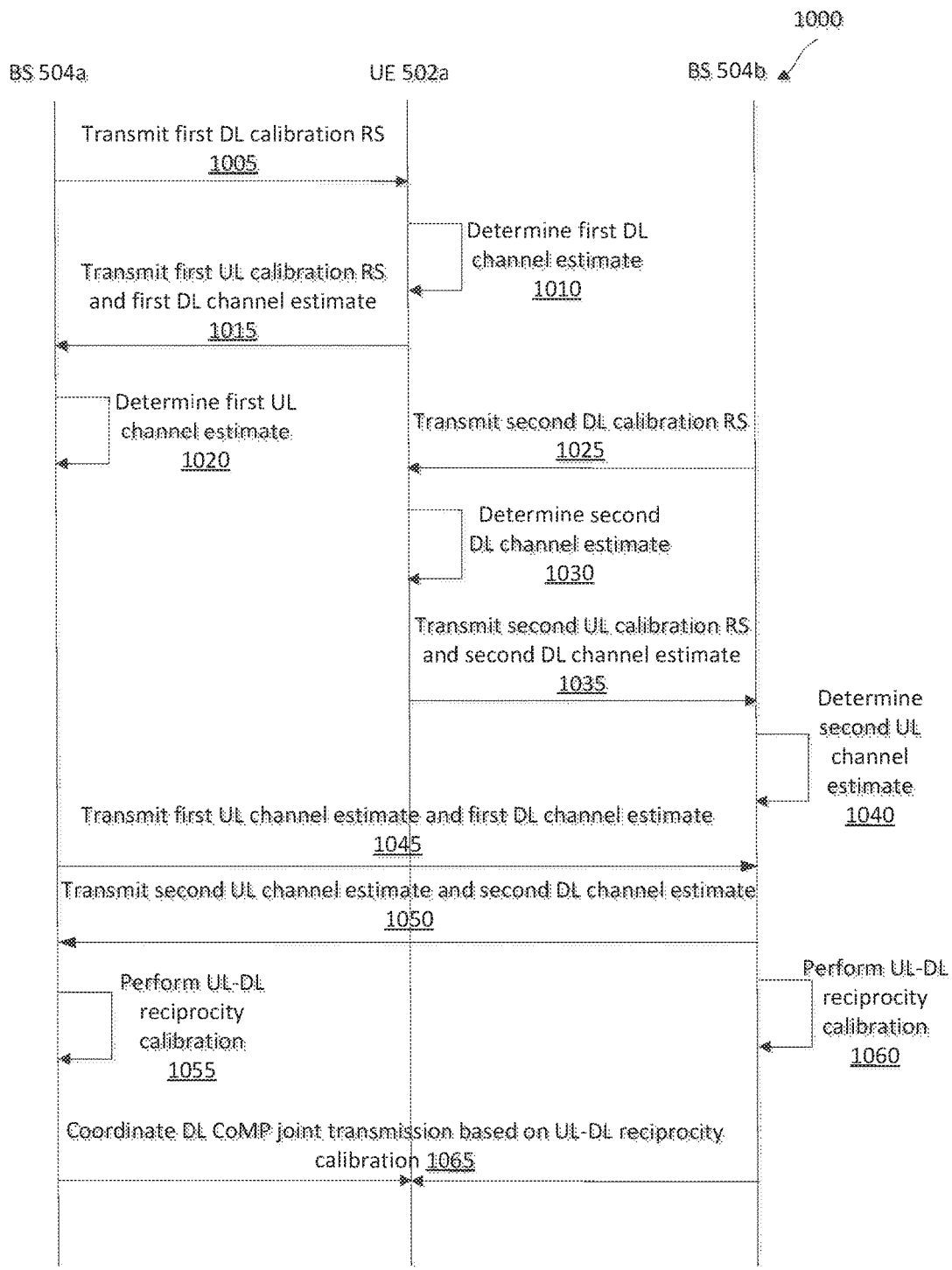
FIG. 10 is a protocol diagram of a method of wireless communication according to embodiments of the present disclosure.

FIG. 10 is a protocol diagram of a method 1000 of wireless communication according to embodiments of the present disclosure. Steps of the method 1000 can be executed by computing devices (e.g., a processor, processing circuit, and/or other suitable component) of wireless communication devices, such as the BSs 104, 204, 504, and 800 and the UEs 102, 202, 502, 602, and 700. The method 1000 can be better understood with reference to FIG. 5. As illustrated, the method 1000 includes a number of enumerated steps, but embodiments of the method 1000 may include additional steps before, after, and in between the enumerated steps. In some embodiments, one or more of the enumerated steps may be omitted or performed in a different order. The method 1000 illustrates two BSs 504 and one selected UE 502 for purpose of simplicity of discussion, though it will be recognized that embodiments of the present disclosure may scale to many more UEs 502 and/or BSs 504.

At step 1005, the BS 504*a* transmits a first DL calibration RS to the UE 502*a*. At step 1010, the UE 502*a* determines a first DL channel estimate based on the first DL calibration RS. At step 1015, the UE 502*a* transmits the determined first DL channel estimate and a first UL calibration RS to the BS 504*a* to facilitate UL-DL reciprocity calibration. At step 1020, the BS 504*a* determines a first UL channel estimate based on the first UL calibration RS.

At step 1025, the BS 504*b* transmits a second DL calibration RS to the UE 502*a*. At step 1030, the UE 502*a* determines a second DL channel estimate based on the second DL calibration RS. At step 1035, the UE 502*a* transmits the determined second DL channel estimate and a second UL calibration RS to the BS 504*b* to facilitate the UL-DL reciprocity calibration. At step 1040, the BS 504*a* determines a second UL channel estimate based on the received second UL calibration RS.

At step 1045, the BS 504*a* may transmit the first UL channel estimate and the first DL channel estimate to the BS 504*b*. Similarly, at step 1050, the BS 504*b* may transmit the second UL channel estimate and the second DL channel estimate to the BS 504*a*. At step 1055, the BS 504*a* may perform UL-DL reciprocity calibration based on the first UL channel estimate, the first DL channel estimate, the second UL channel estimate, and the second DL channel estimate. The BS 504*a* may store the calibration results (e.g., calibration coefficients) in memory (e.g., the memory 804). Similarly, at step 1060, the BS 504*b* may perform UL-DL reciprocity calibration based on the first UL channel estimate, the first DL channel estimate, the second UL channel estimate, and the second DL channel estimate. The BS 504*b* may store the calibration results (e.g., calibration coefficients) in memory (e.g., the memory 804). In some embodiments, the BS 504*a* or 504*b* can operate as a central BS to perform the calibration instead of performing at both the BSs 504*a* and 504*b*.

At step 1065, the BSs 504*a* and 504*b* can coordinate DL CoMP joint transmission based on the UL-DL reciprocity calibration, where the DL CoMP joint transmission is similar to the DL CoMP joint transmission described with respect to FIG. 2. Although the method 1000 is described in the context of the network 500, the method 1000 can be applied to the network 600 with the TPs 604 in place of the BSs 504 and having the first and second UL channel estimates and the UL-DL reciprocity calibration computed at the central unit 630. It should be noted that the steps 1005-1020 may be performed in the order as shown or any suitable order depending on the transmission schemes as described in greater detail herein. For example, the BS 504*a* and 504*b* may transmit the first and second DL calibration RSs at the same time and the UE 502*a* may transmit a single UL calibration RS and the first and second DL channel estimates at the same time.

Figure 11:
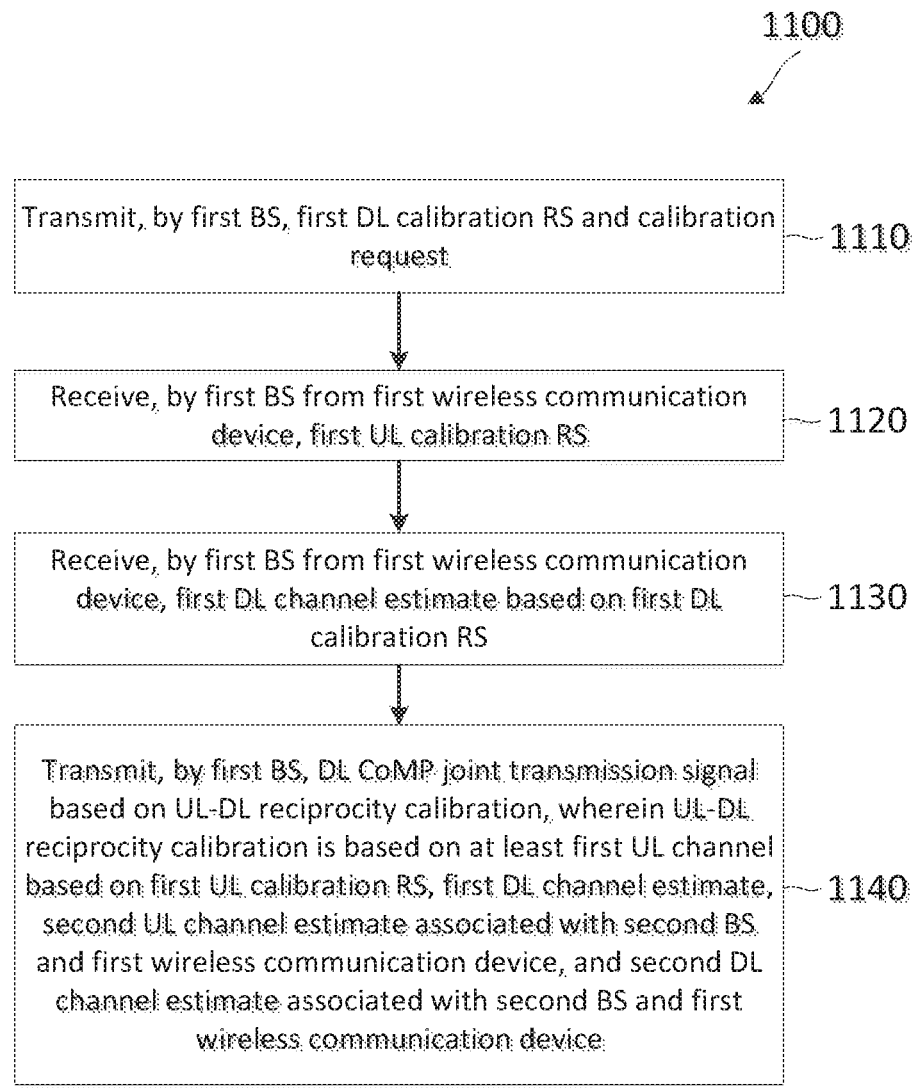
FIG. 11 is a flow diagram of a method of wireless communication according to embodiments of the present disclosure.

FIG. 11 is a flow diagram of a method 1100 of wireless communication according to embodiments of the present disclosure. Steps of the method 1100 can be executed by a computing device (e.g., a processor, processing circuit, and/or other suitable component) of a wireless communication device, such as the BSs 104, 204, and 504, the TPs 604, and the BS 800. The method 1100 may employ similar mechanisms as in the method 1000. The method 1000 can be better understood with reference to FIG. 5. As illustrated, the method 1100 includes a number of enumerated steps, but embodiments of the method 1100 may include additional steps before, after, and in between the enumerated steps. In some embodiments, one or more of the enumerated steps may be omitted or performed in a different order.

At step 1110, the method 1100 includes transmitting, by a first BS (e.g., the BS 504*a*), a first DL calibration RS and a calibration request. The calibration request may request feedback from a particular selected UE (e.g., the UE 502*a*) or to all UEs (e.g., the UEs 502*a*, 502*b*, and 502*c*) participating in the calibration.

At step 1120, the method 1100 includes receiving, by the first BS from a first wireless communication device (e.g., the UE 502*a*), a first UL calibration RS. For example, the first UL calibration RS is received in response to the calibration request.

At step 1130, the method 1100 includes receiving, by the first BS from the first wireless communication device, a first DL channel estimate based on the first DL calibration RS. For example, the first DL channel estimate is received in response to the calibration request.

At step 1140, the method 1100 includes transmitting, by the first BS, a DL CoMP joint transmission signal based on a UL-DL reciprocity calibration, where the UL-DL reciprocity calibration is based on at least a first UL channel estimate based on the first UL calibration RS, the first DL channel estimate, a second UL channel estimate associated with a second BS (e.g., the BS 504*b*) and the first wireless communication device, and a second DL channel estimate associated with the second BS and the first wireless communication device. In some embodiments, the first BS can compute the first UL channel estimate based on the first UL calibration RS and exchange channel estimates with the second BS for the calibration as shown in the method 1000. In some embodiments, the first BS may not include baseband processing, and thus may forward the received first UL calibration RS and first DL channel estimate to a central unit such as the central unit 630 for the calibration.

Figure 12:
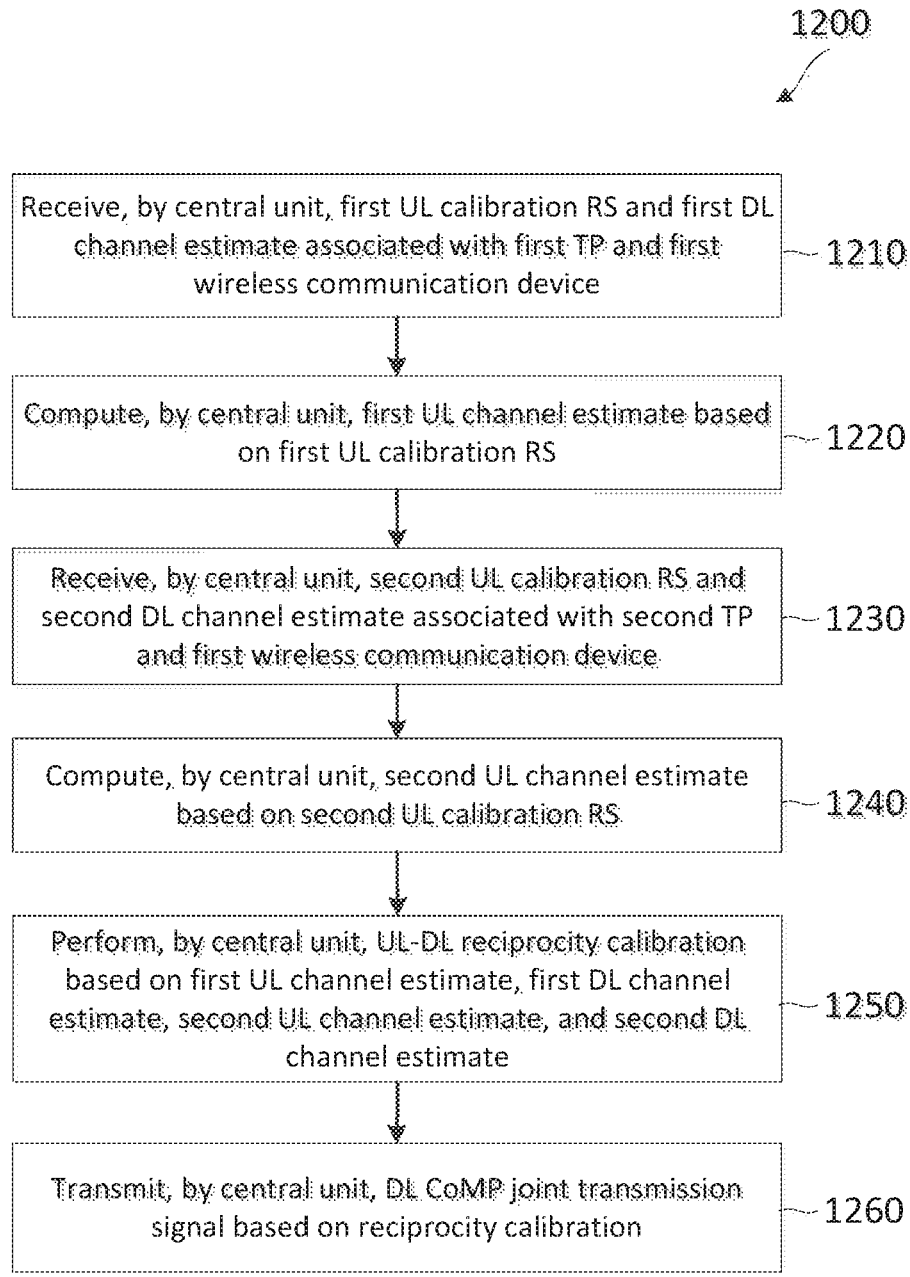
FIG. 12 is a flow diagram of a method of wireless communication according to embodiments of the present disclosure.

FIG. 12 is a flow diagram of a method 1200 of wireless communication according to embodiments of the present disclosure. Steps of the method 1200 can be executed by a computing device (e.g., a processor, processing circuit, and/or other suitable component) of a wireless communication device, such as the central unit 630 and 900. The method 1200 can employ similar mechanisms as the methods 1000 and 1100. The method 1200 can be better understood with reference to FIG. 6. As illustrated, the method 1200 includes a number of enumerated steps, but embodiments of the method 1200 may include additional steps before, after, and in between the enumerated steps. In some embodiments, one or more of the enumerated steps may be omitted or performed in a different order.

At step 1210, the method 1200 includes receiving, by the central unit, a first UL calibration RS and a first DL channel estimate associated with a first TP (e.g., the TP 604*a*) and a first wireless communication device (e.g., the UE 602*a*). In some embodiments, the central unit can transmit a first DL calibration RS to the first TP via a link such as the links 640 to enable the first TP to transmit the first DL calibration RS in the network so that a selected UE can compute the first DL channel estimate.

At step 1220, the method 1200 includes computing, by the central unit, a first UL channel estimate based on the first UL calibration RS.

At step 1230, the method 1200 includes receiving, by the central unit, a second UL calibration RS and a second DL channel estimate associated with a second TP (e.g., the TP 604*b*) and the first wireless communication device. Similarly, in some embodiments, the central unit can transmit a second DL calibration RS to the second TP via a link such as the links 640 to enable the second TP to transmit the second DL calibration RS in the network so that a selected UE can compute the second DL channel estimate.

At step 1240, the method 1200 includes computing, by the central unit, a second UL channel estimate based on the second UL calibration RS.

At step 1250, the method 1200 includes performing, by the central unit, a UL-DL reciprocity calibration based on the first UL channel estimate, the first DL channel estimate, the second UL channel estimate, and the second DL channel estimate. The calibration can include determining a gain and/or phase mismatch between each pair of UL and DL channels and computing a set of calibration coefficients to account for the mismatches of between all the UL and DL channels. The central unit may store the computed calibration coefficients in memory (e.g., the memory 904). The calibration algorithm is described in greater detail with respect to FIG. 13.

At step 1260, the method 1200 includes transmitting, by the central unit, a DL CoMP joint transmission signal based on the UL-DL reciprocity calibration. The transmission can include receiving a SRS associated with the first TP and the first wireless communication device and performing beamforming to create DL beams based on the received SRS and calibration coefficients stored in the memory such that the reception quality at a targeted UE is increased and interferences at other UEs are decreased or cancelled.

Figure 13:
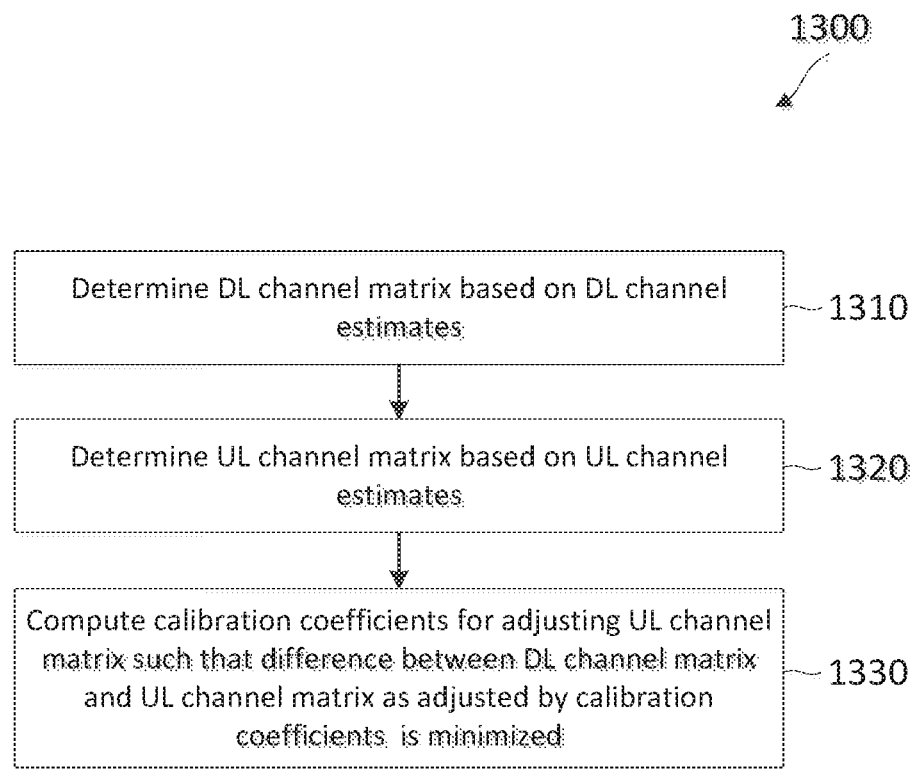
FIG. 13 is a flow diagram of a method of UL-DL reciprocity calibration coefficient computation according to embodiments of the present disclosure.

FIG. 13 is a flow diagram of a method 1300 of UL-DL reciprocity calibration coefficient computation according to embodiments of the present disclosure. Steps of the method 1300 can be executed by a computing device (e.g., a processor, processing circuit, and/or other suitable component) of a wireless communication device, such as the BSs 504 and the central unit 630. The method 1300 can be better understood with reference to FIGS. 5 and 6. The method 1300 can be employed by the methods 1000, 1100, and 1200 to determine the UL-DL reciprocity calibration. As illustrated, the method 1300 includes a number of enumerated steps, but embodiments of the method 1300 may include additional steps before, after, and in between the enumerated steps. In some embodiments, one or more of the enumerated steps may be omitted or performed in a different order.

At step 1310, the method 1300 includes determining a DL channel matrix based on DL channel estimates. For example, the DL channel estimates correspond to the DL channel estimates transmitted by the selected UEs 502 and received by the cooperative BSs 504 or TPs 604 at the steps 1015 and 1035. The DL channel matrix can be expressed as shown below:

$$Y = \Phi_{UR} \times H_{DL} \times \Phi_{BT} + N_{DL}, \quad (3)$$

where Y represents the DL channel matrix including the received DL channel estimates, $\Phi_{UR}$ represents mismatches due to the RF receiver chains of the selected UEs, $H_{DL}$ represents the DL channels (e.g., the physical over-the-air channels) from the cooperative BSs or the cooperative TPs to corresponding selected UEs, $\Phi_{BT}$ represents mismatches due to the RF transmitter chain of the cooperative BSs or the cooperative TPs, and $N_{DL}$ represents noise in the DL channels. $H_{DL}$ can be similar to the channel matrix shown in equation (1).

At step 1320, the method 1300 includes determining a UL channel matrix based on UL channel estimates. For example, the UL channel estimates correspond to the UL channel estimates computed by the cooperative BSs at the steps 1020 and 1040 or the central unit 630 at the steps 1220 and 1240. The UL channel matrix can be expressed as shown below:

$$Z = \Phi_{BR} \times H_{UL} \times \Phi_{UT} + N_{UL}, \quad (4)$$

where Z represents the UL channel matrix including the received UL channel estimates, $\Phi_{BR}$ represents mismatches due to the RF received chains of the cooperative BSs or the TPs, $H_{UL}$ represents the UL channels (e.g., the physical over-the-air channels) from the selected UEs to corresponding BSs 504 or the TPs 604, $\Phi_{UT}$ represents mismatches due to the RF transmitter chains of the selected UEs, and $N_{UL}$ represents noise in the UL channels. $H_{UL}$ can be similar to the channel matrix shown in equation (1).

At step 1330, the method includes computing calibration coefficients for adjusting the UL channel matrix such that a difference between the DL channel matrix and the UL channel matrix as adjusted by the calibration coefficients is minimized. For example, equations (3) and (4) can be combined and expressed as shown below:

$$\text{diag}(\alpha) \times Z^T \times \text{diag}(\beta) = Y, \quad (5)$$

where $\text{diag}(\alpha) = \Phi_{UR} \times \Phi_{UR}^{-1}$, the superscript T represents a matrix transpose, and $\text{diag}(\beta) = \Phi_{BT} \times \Phi_{BR}^{-1}$. Thus, the calibration can compute the vectors $\alpha$ and $\beta$ and uses the vectors $\alpha$ and $\beta$ as the calibration coefficients for adjusting subsequent UL channel estimates obtained from SRSs during normal operation.

In one embodiment, the method 1300 computes the calibration coefficients by performing eigenvector decomposition. For example, a least-square cost function can be defined as follows:

$$Y(b) = \text{vec}(\text{diag}(\alpha) \times Z^T \times \text{diag}(\beta) - Y)^H \times \text{vec}(\text{diag}(\alpha) \times Z^T \times \text{diag}(\beta) - Y), \quad (6)$$

where Y(b) represents the cost function, vec is a m×n vector converted from a m×n matrix, the superscript H represents a Hermitian matrix transpose, and $b = [\beta^T, \alpha^T]^T$. The term $\text{diag}(\alpha) \times Z^T \times \text{diag}(\beta)$ represents the calibration adjusted UL channel matrix.

The cost function shown in equation (6) can be minimized by determining a unit-norm eigenvector of the following matrix W:

$$W = \begin{bmatrix} A_{M \times M} & C_{M \times J} \\ D_{J \times M} & B_{J \times J} \end{bmatrix}, \quad (7)$$

where $A = \text{diag}(Z \times Z^H)$, $B = \text{diag}(Y^H \times Y)$, $C = -Y^T \times Z^H$, and $D = -Z^T \times Y^H$.

In another embodiment, the method 1300 computes the calibration coefficients by performing maximal ratio combining (MRC). For example, the MRC begins with initializing the vectors $\alpha$ and $\beta$ to all values of ones and updating $\alpha$ and $\beta$ in a number of iterations. Each iteration updates $\alpha$ and $\beta$ as shown below:

$$A = \text{diag}(\alpha) \times Z^T,$$

$$\beta = \frac{\text{diag}(A \times Y)}{\text{diag}(A \times A)},$$

$$B = \text{diag}(\beta) \times Z,$$

$$\alpha = \frac{\text{diag}(B \times Y^T)}{\text{diag}(B \times B)}.$$

The updating of $\alpha$ and $\beta$ can be terminated when the desired SINRs are achieved at the selected UEs.

Figure 14:
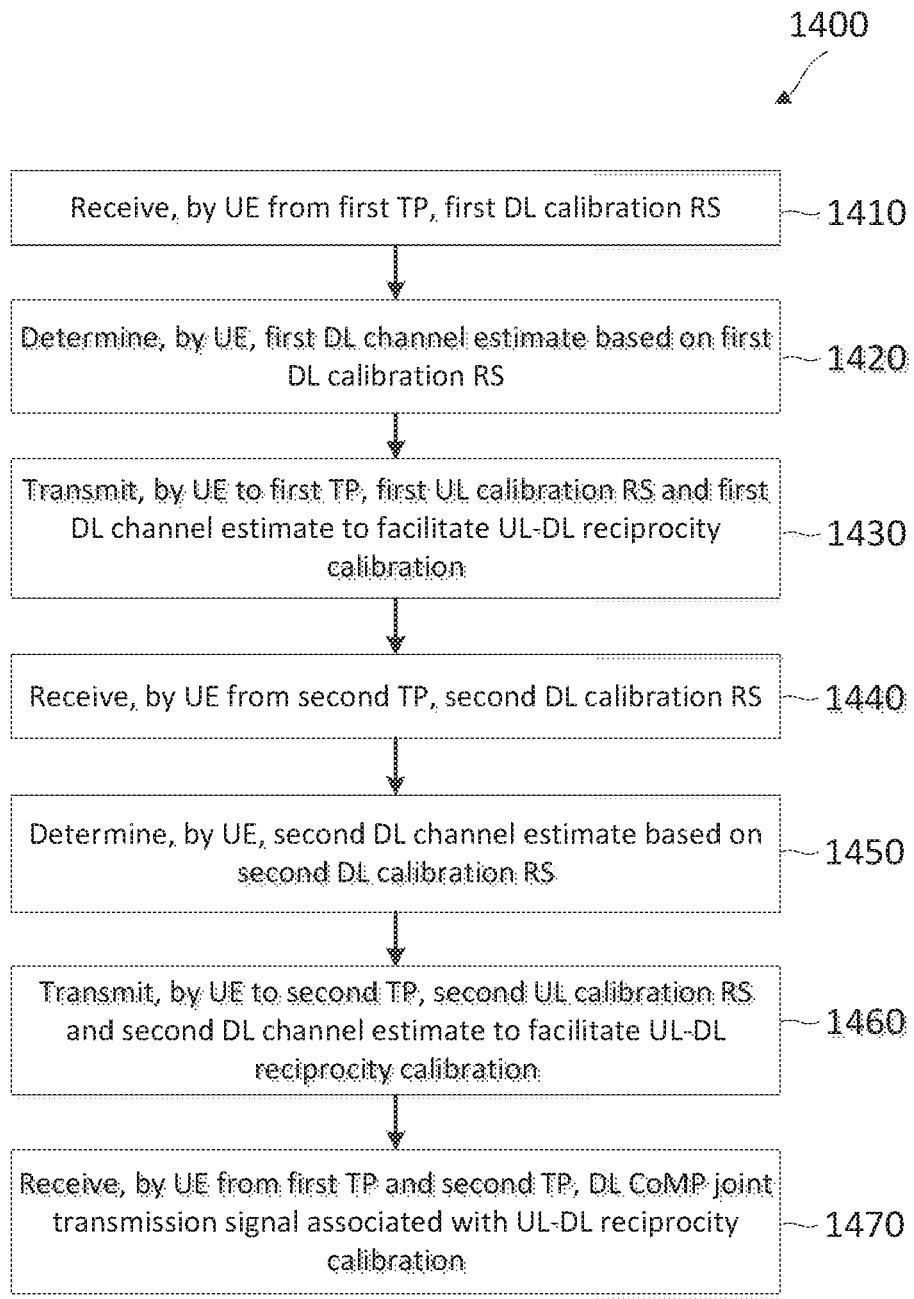
FIG. 14 is a flow diagram of a method of wireless communication according to embodiments of the present disclosure.

FIG. 14 is a flow diagram of a method 1400 of wireless communication according to embodiments of the present disclosure. Steps of the method 1400 can be executed by a computing device (e.g., a processor, processing circuit, and/or other suitable component) of a wireless communication device, such as the UEs 102, 202, 502, and 602. The method 1400 can be better understood with reference to FIGS. 5 and 6. As illustrated, the method 1400 includes a number of enumerated steps, but embodiments of the method 1400 may include additional steps before, after, and in between the enumerated steps. In some embodiments, one or more of the enumerated steps may be omitted or performed in a different order.

At step 1410, the method 1400 includes receiving, by a UE (e.g., the UE 602*a*) from a first TP (e.g., the TP 604*a*), a first DL calibration RS. At step 1420, the method 1400 includes determining, by the UE, a first DL channel estimate based on the first DL calibration RS. At step 1430, the method 1400 includes transmitting, by the UE to the first TP, a first UL calibration RS and the first DL channel estimate to facilitate a UL-DL reciprocity calibration.

At step 1440, the method 1400 includes receiving, by the UE from a second TP (e.g., the TP 604*b*), a second DL calibration RS. At step 1450, the method 1400 includes determining, by the UE, a second DL channel estimate based on the second DL calibration RS. At step 1460, the method 1400 includes transmitting, by the UE to the second TP, a second UL calibration RS and the second DL channel estimate to facilitate the UL-DL reciprocity calibration.

At step 1470, the method 1400 includes receiving, by the UE from the first TP and the second TP, a DL CoMP joint transmission signal associated with the UL-DL reciprocity calibration. In an embodiment, the DL CoMP joint transmission signal carries data destined for the UE. In another embodiment, the DL CoMP joint transmission signal facilitates interference nulling at the UE. Although the method 1300 is described in the context of the network 600, the method 1300 can be applied to the network 500, where the UE communicates with the BSs 504 instead of the TPs 604 using similar mechanisms. It should be noted that the UE may receive the first and second DL calibration RSs at the same time and/or may transmit a single UL calibration RS to both the first and second TPs depending on the transmission schemes as described in greater detail herein.

Figure 15:
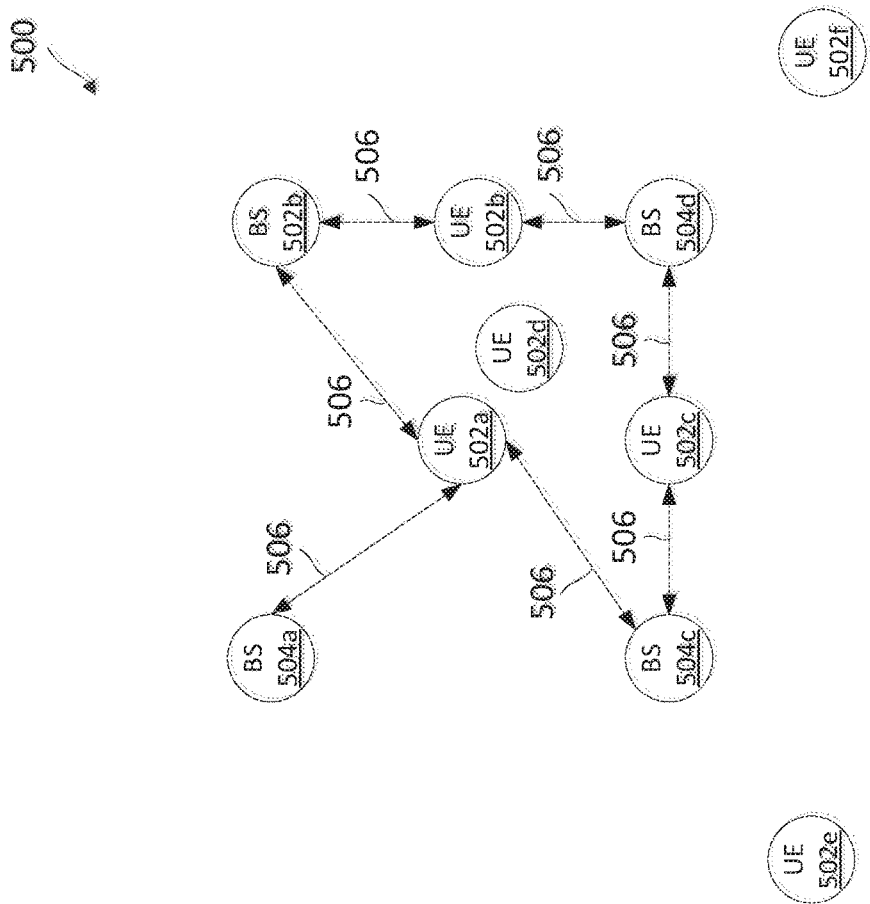
FIG. 15 is illustrates a UE selection scenario in a wireless communication network according to embodiments of the present disclosure.

FIG. 15 is illustrates a UE selection scenario in the wireless communication network 500 according to embodiments of the disclosure. As described above, the BSs 504 cooperatively serves the UEs 502. The BSs 504 can select any suitable number of UEs 502 as anchoring UEs for the over-the-air UL-DL reciprocity calibration. The calibration performance can improve when employing more anchoring UEs and/or when the anchoring UEs have strong links to the BSs 504 that are in cooperation. In an embodiment, the BSs 504 select UEs 502 that have high link quality or SNRs to the BSs 504. The UEs 502 are selected such that the cooperating BSs 504 are fully connected via the selected calibration links 506. The BSs 504 can determine the link SNRs based on long-term measurements such as reference signal received power (RSRP) reported by the UEs 502 or prior history of measured RS. As shown, the BSs 504 selected the UEs 502*a*, 502*b*, and 502*c* for the calibration.

In another embodiment, the BSs 504 can request the UEs 502 to participate in the calibration and the UEs 502 that meet certain criteria may respond to the BSs 504. Some examples of criteria may include rules and/or thresholds determined by the BSs 504 prior to the calibration. In another embodiment, the BSs 504 can use all the links 506 for the calibration.

The BSs 504 can coordinate with each other to perform the selection. In some embodiments, one of the BSs 504 can act as a central BS and perform the selection based on measurements collected from the other BSs 504. Although the selection is described in the context of the network 500, the same selection can be applied in the network 600, where the selection is performed by the central unit 630.

Figure 16:
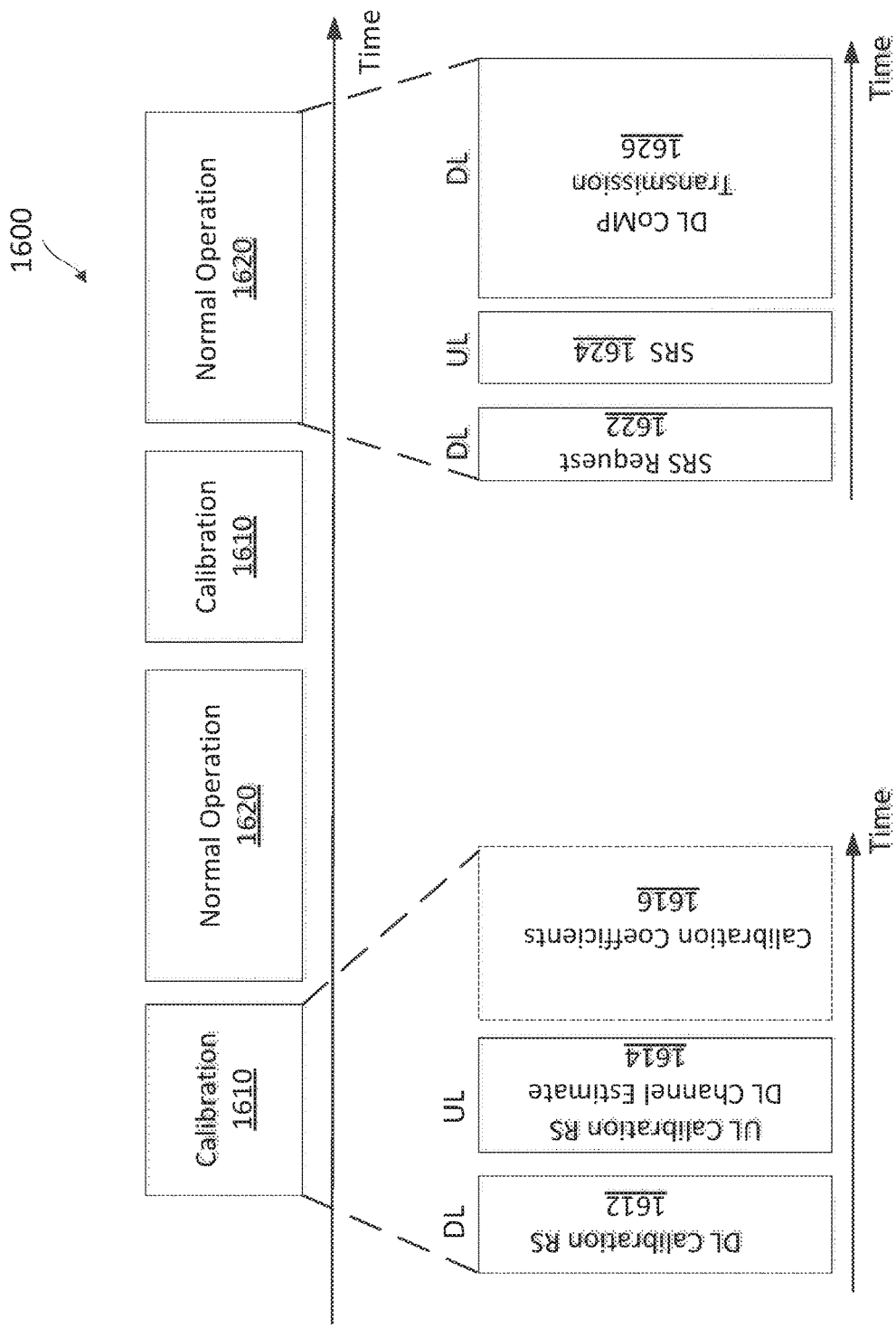
FIG. 16 is a timing diagram illustrating a wireless communication scheme including UL-DL reciprocity calibration according to embodiments of the present disclosure.

FIG. 16 is a timing diagram illustrating a wireless communication scheme 1600 including UL-DL reciprocity calibration according to embodiments of the present disclosure. The scheme 1600 can be employed by BSs 104, 204, and 504, the UEs 102, 202, 502, and 602, the TPs 604, and the central unit 630 and may include similar mechanisms as described in the methods 1000, 1100, and 1300. In FIG. 16, the x-axes represent time in some arbitrary constant units.

The scheme 1600 includes a plurality of calibration phases 1610 and a plurality of normal operation phases 1620. The calibration phases 1610 and the calibration phases 1620 can span any suitable amount of time. The calibration phases 1610 is repeated at some time intervals between the normal operation phases 1620.

Each calibration phase 1610 includes portions 1612, 1614, and 1616. The BSs 504 or the TPs 604 can transmit DL calibration RSs to the UEs 502 or 602, respectively, in the portion 1612. The UEs 502 or 602 can transmit UL calibration RSs and DL channel estimates to the BSs 504 or the TPs 604, respectively, in the portion 1614. The BSs 504 or the central unit 630 can compute calibration coefficients in the portion 1616. In some embodiments, the calibration phase 1610 can include multiple portions 1612 and 1614 prior to the portion 1616, as described in greater detail herein.

The normal operation phase 1620 includes portions 1622, 1624, and 1626. The BSs 504 or the TPs 604 can transmit SRS requests to the UEs 502 or 602, respectively, in the portion 1622. The UEs 502 or 602 can transmit SRSs to the BSs 504 or the TPs 604, respectively, in the portion 1624. The BSs 504 or the TPs 604 can transmit DL CoMP data signals to the UEs 502 or 602, respectively, in the portion 1626, for example, by applying the computed calibration coefficients to the SRSs to beamform the DL CoMP data signals. The normal operation phase can include multiple portions of 1622, 1624, and 1626.

Figure 17:
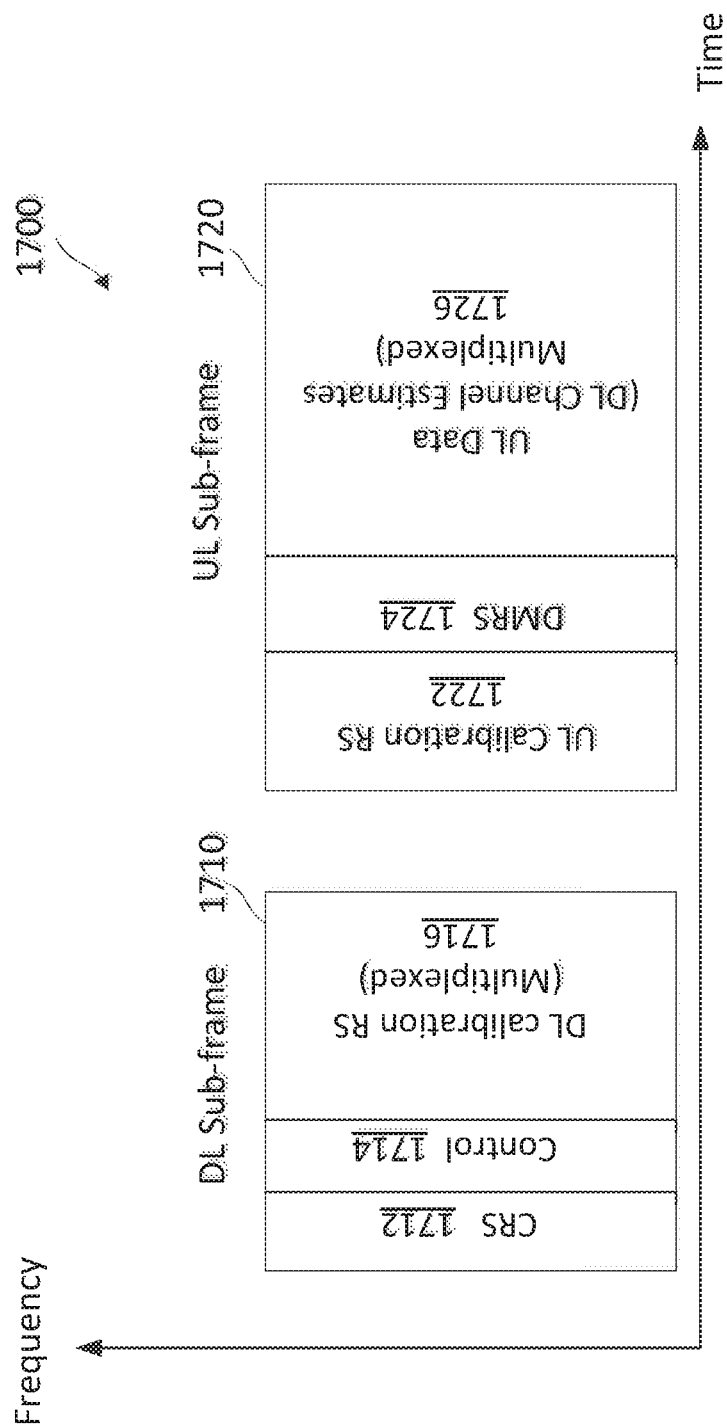
FIG. 17 illustrates a calibration frame structure for exchanging uplink (UL) and DL calibration reference signals (RSs) on a per UE basis according to embodiments of the present disclosure.
Figure 18:
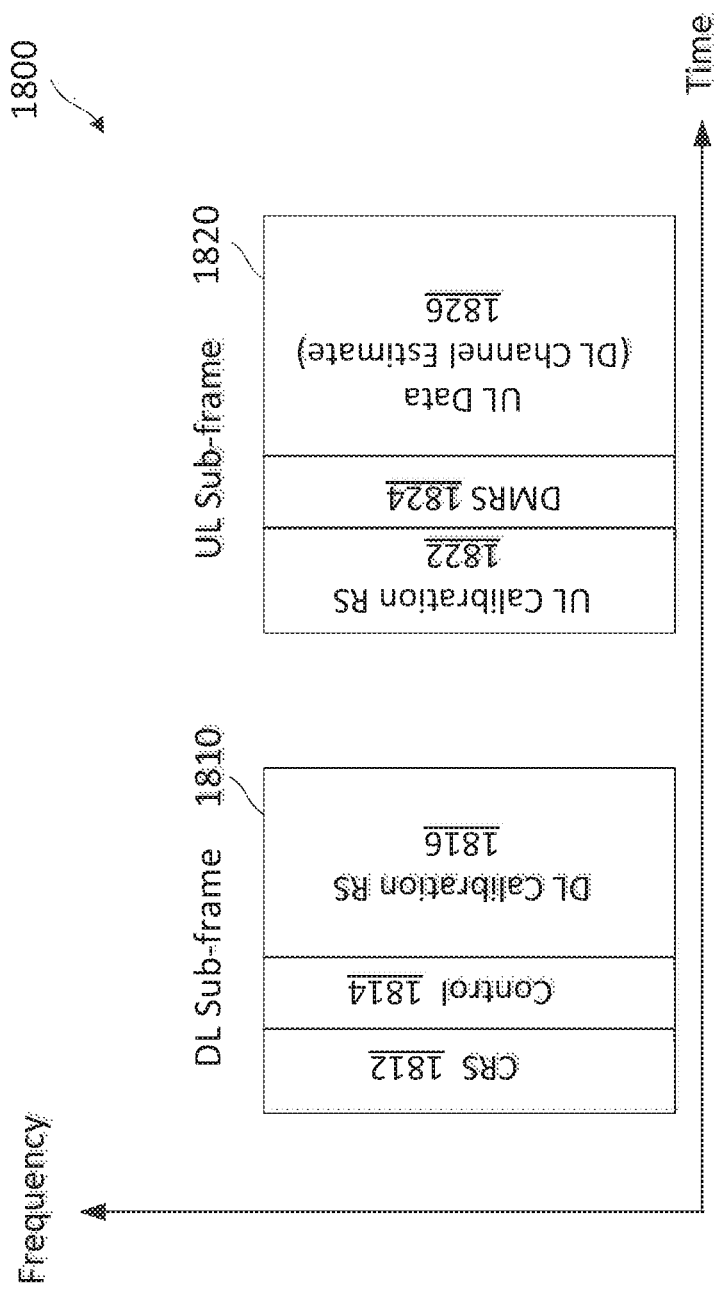
FIG. 18 illustrates a calibration frame structure for exchanging UL and DL calibration RSs on a per link basis according to embodiments of the present disclosure.

FIGS. 17-20 illustrate several calibration frame structures for the BSs 104, 204, and 504, the UEs 102, 202, 502, and 602, the TPs 604 to exchange DL calibration RSs and UL calibration RSs for UL-DL reciprocity calibration and may be employed by the methods 1000, 1100, and 1300. In FIGS. 16-18, the x-axes represent time in some arbitrary constant units and the y-axes represent frequency in some arbitrary constant units.

FIG. 17 illustrates a calibration frame structure 1700 for exchanging UL and DL calibration RSs on a per UE basis according to embodiments of the present disclosure. The calibration frame structure 1700 includes a DL subframe 1710 and a UL subframe 1720. The DL subframe 1710 includes a cell-specific reference signal (CRS) portion 1712, a control portion 1714, and DL calibration RS portion 1716. The CRS portion 1712 carries a CRS, which may facilitate receive power measurements at the UEs 502 or 602. The control portion 1714 carries multiplexed calibration requests. The DL calibration RS portion 1716 carries multiplexed DL calibration RSs (e.g., via orthogonal multiplexing). The UL subframe 1720 includes a UL calibration RS portion 1722, a demodulation reference signal (DMRS) portion 1724, and a UL payload portion 1726. The UL calibration RS portion 1722 carries a broadcast UL calibration RSs. The DMRS portion 1724 carries a DMRS, which may facilitate demodulation at the UEs 502 or 602. The UL payload portion 1726 carries multiplexed DL channel estimates.

To perform per UE exchange, the cooperative BSs 504 in the network 500 or the cooperative TPs 604 in the network 600 can each transmit a DL calibration RS in the DL calibration RS portion 1716 and a calibration request in the control portion 1714 to a particular selected UE (e.g., UE 502*a* or 602*a*) requesting calibration feedback. In response, the particular selected UE can compute a DL channel estimates based on each received DL calibration RS, broadcast a UL calibration RS in the UL calibration RS portion 1722, and transmit the computed DL channel estimates in the UL payload portion 1726. Thus, the number of frames to complete a calibration is dependent on the number of selected UEs such as the UEs 502*a*, 502*b*, and 502*c* in the network 500 or the UEs 602*a*, 602*b*, and 602*c* in the network 600.

FIG. 18 illustrates a calibration frame structure 1800 for exchanging UL and DL calibration RSs on a per link basis according to embodiments of the present disclosure. The calibration frame structure 1800 includes a DL subframe 1810 and a UL subframe 1820. The DL subframe 1810 includes a CRS portion 1812 similar to the CRS portion 1712, a control portion 1814, and a DL calibration RS portion 1816. The control portion 1814 carries a calibration request. The DL calibration RS portion 1816 carries a DL calibration RS. The UL subframe 1820 includes a UL calibration RS portion 1822, a DMRS portion 1824 similar to the DMRS portion 1724, and a UL payload portion 1826. The UL calibration RS portion 1822 carries a UL calibration RS. The UL payload portion 1826 carries a DL channel estimate.

To perform per link exchange, a cooperative BS 504 in the network 500 or a cooperative TP 604 in the network 600 can transmit a DL calibration RS in the DL calibration RS portion 1716 and a calibration request in the control portion 1714 to a particular selected UE (e.g., UE 502*a* or 602*a*) requesting calibration feedback. In response, the particular selected UE can compute a DL channel estimates based on each received DL calibration RS, transmit a UL calibration RS in the UL calibration RS portion 1722 and the computed DL channel estimate in the UL payload portion 1726. Thus, the number of frames to complete a calibration is dependent on the number of calibration links such as the links 506 in the network 500.

Figure 19:
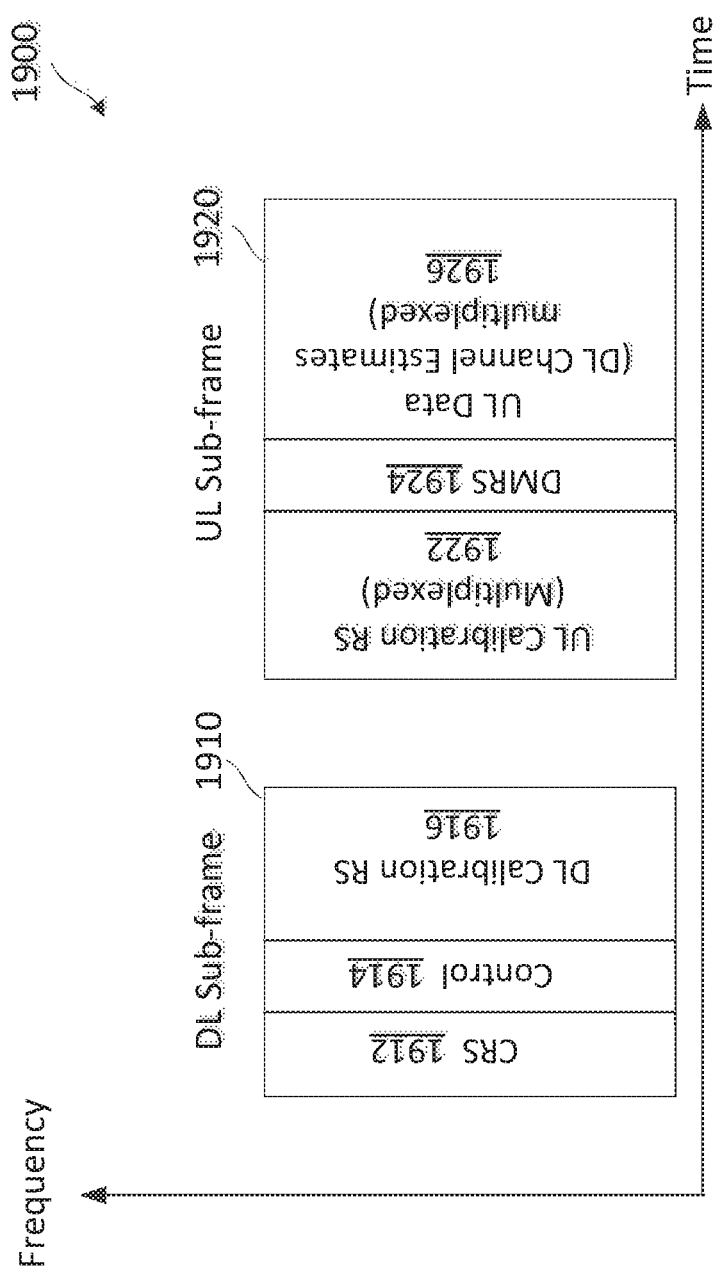
FIG. 19 illustrates a calibration frame structure for exchanging UL and DL calibration RSs on a per base station (BS) or per transmission point (TP) basis according to embodiments of the present disclosure.

FIG. 19 illustrates a calibration frame structure 1900 for exchanging UL and DL calibration RSs on a per BS or TP basis according to embodiments of the present disclosure. The calibration frame structure 1900 includes a DL subframe 1910 and a UL subframe 1920. The DL subframe 1910 includes a CRS portion 1912 similar to the CRS portion 1712, a control portion 1914, and a DL calibration RS portion 1916. The control portion 1914 carries multiplexed calibration requests. The DL calibration RS portion 1916 carries a DL calibration RS. The UL subframe 1920 includes a UL calibration RS portion 1922, a DMRS portion 1924 similar to the DMRS portion 1742, and a UL payload portion 1926. The UL calibration RS portion 1922 carries multiplexed UL calibration RSs. The UL payload portion 1926 carries multiplexed DL channel estimates.

To perform per TP exchange, each cooperative BS 504 in the network 500 or each cooperative TP 604 in the network 600 can transmit a DL calibration RS in the DL calibration RS portion 1716 and a calibration request in the control portion 1714 to all selected UEs (e.g., the UE 502*a*, 502*b*, and 502*c* or the UEs 602*a*, 602*b*, and 602*c*) requesting calibration feedbacks. In response, each selected UE can compute a DL channel estimate based on each received DL calibration RS. Each selected UE can transmit a UL calibration RS in the UL calibration RS portion 1922 and the computed DL channel estimate in the UL payload portion 1926. Thus, the number of frames to complete a calibration is dependent on the number of cooperative BSs such as the BSs 504 in the network 500 or cooperative TPs such as the TPs 604 in the network 600.

FIG. 20 illustrates a calibration frame structure 2000 for exchanging UL and DL calibration RSs in a single shot according to embodiments of the present disclosure. The calibration frame structure 2000 includes a DL subframe 2010 and a UL subframe 2020. The DL subframe 2010 includes a CRS portion 2012 similar to the CRS portion 1712, a control portion 2014, and a DL calibration RS portion 2016. The control portion 2014 carries multiplexed calibration requests. The DL RS calibration RS portion 2016 carries multiplexed DL calibration RSs (e.g., via orthogonal multiplexing). The UL subframe 2020 includes a UL calibration RS portion 2022, a DMRS portion 2024 similar to the DMRS portion 1742, and a UL payload portion 2026. The UL calibration RS portion 2022 carries multiplexed UL calibration RSs. The UL payload portion 2026 carries multiplexed DL channel estimates.

To perform one shot exchange, the cooperative BSs 504 in the network 500 or the cooperative TPs 604 in the network 600 each can transmit a DL calibration RS in the DL calibration RS portion 1716 and a calibration request in the control portion 1714 to all selected UEs (e.g., the UE 502*a*, 502*b*, and 502*c* or the UEs 602*a*, 602*b*, and 602*c*) requesting calibration feedbacks. In response, each selected UE can compute a DL channel estimate based on each received DL calibration RS. Each selected UE can transmit a UL calibration RS in the UL calibration RS portion 1922 and the computed DL channel estimate in the UL payload portion 1926. Thus, the number of frames to complete a calibration is dependent on the number of cooperative BSs such as the BSs 504 in the network 500 or cooperative TPs such as the TPs 604 in the network 600. In some embodiments, when the number of selected UEs is large, the UL payload portion 2026 can be divided into multiple portions and transmitted in multiple UL subframes 2020.

In the context of LTE, the control portions 1714, 1814, 1914, and 2014 may correspond to physical DL control channel (PDCCH). The UL payload portions 1726, 1826, 1926, and 2026 may correspond to physical UL shared channel (PUSCH).

Further embodiments of the present disclosure include a computer-readable medium having program code recorded thereon, the program code comprising code for causing a central unit to transmit a downlink (DL) calibration reference signal (RS) and a calibration request; code for causing the central unit to receive, in response to the calibration request, a first uplink (UL) calibration RS and a first DL channel estimate associated with a first transmission point (TP) and a first wireless communication device; and code for causing the central unit to transmit a DL coordinated multipoint (CoMP) joint transmission signal according to an uplink-downlink (UL-DL) reciprocity calibration, wherein the UL-DL reciprocity calibration is based on at least a first UL channel estimate based on the first UL calibration RS, the first DL channel estimate, a second UL channel estimate associated with a second TP and the first wireless communication device, and a second DL channel estimate associated with the second TP and the first wireless communication device.

In some embodiments, the UL-DL reciprocity calibration includes one or more calibration coefficients for adjusting the first UL channel estimate to more closely match the first DL channel estimate. In some embodiments, the program code further comprises code for causing the central unit to determine the UL-DL reciprocity calibration by determining a DL channel matrix based on the first DL channel estimate and the second DL channel estimate; code for causing the central unit to determine a UL channel matrix based on the first UL channel estimate and the second UL channel estimate; and code for causing the central unit to compute one or more calibration coefficients for adjusting the UL channel matrix such that a difference between the DL channel matrix and the UL channel matrix as adjusted by the one or more calibration coefficients is reduced. In some embodiments, the program code further comprises code for causing the central unit to receive a sounding reference signal (SRS) associated with the first wireless communication device, wherein the DL CoMP joint transmission signal is further based on the SRS. In some embodiments, the calibration request is directed to the first wireless communication device, and wherein the first DL channel estimate is based on the DL calibration RS. In some embodiments, the calibration request is directed to a plurality of wireless communication devices including the first wireless communication device and a second wireless communication device, wherein the program code further comprises code for causing the central unit to receive, in response to the calibration request, a second UL calibration RS and a third DL channel estimate based on the DL calibration RS, wherein the second UL calibration RS and the third DL channel estimate are associated with the first TP and a second wireless communication device, and wherein the UL-DL reciprocity calibration is further based on the second UL calibration RS and the third DL channel estimate. In some embodiments, the program code further comprises code for causing the central unit to select the first wireless communication device for the UL-DL reciprocity calibration from among a plurality of wireless communication devices based on a link quality of the first wireless communication device to at least the first TP. In some embodiments, the central unit is positioned remote from the first TP. In some embodiments, the central unit is collocated with the first TP.

Further embodiments of the present disclosure include a computer-readable medium having program code recorded thereon, the program code comprising code for causing a UE to receive, from a first transmission point (TP), a first downlink (DL) calibration reference signal (RS) and a calibration request; code for causing the UE to determine a first DL channel estimate based on the first DL calibration RS; code for causing the UE to transmit, to the first TP in response to the calibration request, a first uplink (UL) calibration RS and the first DL channel estimate to facilitate an uplink-downlink (UL-DL) reciprocity calibration; and code for causing the UE to receive a DL coordinated multipoint (CoMP) joint transmission signal transmitted according to the UL-DL reciprocity calibration.

In some embodiments, the program code further comprises code for causing the UE to receive, from a second TP, a second DL calibration RS; code for causing the UE to determine a second DL channel estimate based on the second DL calibration RS; and code for causing the UE to transmit, to the second TP, a second UL calibration RS and the second DL channel estimate to facilitate the UL-DL reciprocity calibration. In some embodiments, the DL CoMP joint transmission signal is received from the first TP and the second TP. In some embodiments, the code for receiving the first DL calibration RS is further configured to receive a DL multiplexed signal carrying a second DL calibration RS associated with a second TP and the first DL calibration RS, wherein the program code further comprises code for causing the UE to determine a second DL channel estimate based on the second DL calibration RS, and wherein the code for transmitting the first UL calibration RS and the first DL channel estimate is further configured to transmit a UL multiplexed signal carrying the first UL calibration RS, the first DL channel estimate, and the second DL channel estimate. In some embodiments, the program code further comprises code for causing the UE to transmit, to the first TP, a sounding reference signal (SRS), wherein the received DL CoMP joint transmission signal is based in part on the SRS. In some embodiments, the program code further comprises code for causing the UE to determine whether a communication link between the UE and the first TP satisfies a calibration rule, wherein the first UL calibration RS and the first DL channel estimate are transmitted when the communication link between the UE and the first TP is determined to satisfy the calibration rule.

Further embodiments of the present disclosure include an apparatus comprising means for receiving a first uplink (UL) calibration reference signal (RS) and a first DL channel estimate associated with a first transmission point (TP) and a first wireless communication device; means for transmitting a downlink (DL) calibration reference signal (RS) and a calibration request, wherein the first UL calibration RS and the first DL channel estimate are received in response to the calibration request; and means for transmitting a DL coordinated multipoint (CoMP) joint transmission signal according to an uplink-downlink (UL-DL) reciprocity calibration, wherein the UL-DL reciprocity calibration is based on at least a first UL channel estimate based on the first UL calibration RS, the first DL channel estimate, a second UL channel estimate associated with a second TP and the first wireless communication device, and a second DL channel estimate associated with the second TP and the first wireless communication device.

In some embodiments, the UL-DL reciprocity calibration includes one or more calibration coefficients for adjusting the first UL channel estimate to more closely match the first DL channel estimate. In some embodiments, the apparatus further comprises means for determining the UL-DL reciprocity calibration by determining a DL channel matrix based on the first DL channel estimate and the second DL channel estimate; means for determining a UL channel matrix based on the first UL channel estimate and the second UL channel estimate; and means for computing one or more calibration coefficients for adjusting the UL channel matrix such that a difference between the DL channel matrix and the UL channel matrix as adjusted by the one or more calibration coefficients is reduced. In some embodiments, the apparatus further comprises means for receiving a sounding reference signal (SRS) associated with the first wireless communication device, wherein the DL CoMP joint transmission signal is further based on the SRS. In some embodiments, the calibration request is directed to the first wireless communication device, and wherein the first DL channel estimate is based on the DL calibration RS. In some embodiments, the calibration request is directed to a plurality of wireless communication devices including the first wireless communication device and a second wireless communication device, wherein the apparatus further comprises means for receiving, in response to the calibration request, a second UL calibration RS and a third DL channel estimate based on the DL calibration RS, wherein the second UL calibration RS and the third DL channel estimate are associated with the first TP and a second wireless communication device, and wherein the UL-DL reciprocity calibration is further based on the second UL calibration RS and the third DL channel estimate. In some embodiments, the apparatus further comprises means for selecting the first wireless communication device for the UL-DL reciprocity calibration from among a plurality of wireless communication devices based on a link quality of the first wireless communication device to at least the first TP. In some embodiments, the apparatus is positioned remote from the first TP. In some embodiments, the apparatus is collocated with the first TP.

Further embodiments of the present disclosure include an apparatus means for receiving, from a first transmission point (TP), a first downlink (DL) calibration reference signal (RS) and a calibration request; means for determining a first DL channel estimate based on the first DL calibration RS; means for transmitting, to the first TP in response to the calibration request, a first uplink (UL) calibration RS and the first DL channel estimate to facilitate an uplink-downlink (UL-DL) reciprocity calibration; and means for receiving a DL coordinated multipoint (CoMP) joint transmission signal transmitted according to the UL-DL reciprocity calibration.

In some embodiments, the apparatus further comprises means for receiving, from a second TP, a second DL calibration RS; means for determining a second DL channel estimate based on the second DL calibration RS; and means for transmitting, to the second TP, a second UL calibration RS and the second DL channel estimate to facilitate the UL-DL reciprocity calibration. In some embodiments, the DL CoMP joint transmission signal is received from the first TP and the second TP. In some embodiments, the means for receiving the first DL calibration RS is further configured to receive a DL multiplexed signal carrying a second DL calibration RS associated with a second TP and the first DL calibration RS, wherein the apparatus further comprises means for determining a second DL channel estimate based on the second DL calibration RS, and wherein the means for transmitting the first UL calibration RS and the first DL channel estimate is further configured to transmit a UL multiplexed signal carrying the first UL calibration RS, the first DL channel estimate, and the second DL channel estimate. In some embodiments, the apparatus further comprises means transmitting, to the first TP, a sounding reference signal (SRS), wherein the received DL CoMP joint transmission signal is based in part on the SRS. In some embodiments, the apparatus further comprises means for determining whether a communication link between the UE and the first TP satisfies a calibration rule, wherein the first UL calibration RS and the first DL channel estimate are transmitted when the communication link between the UE and the first TP is determined to satisfy the calibration rule.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method of wireless communication, comprising:
   transmitting, by a central unit, a downlink (DL) calibration reference signal (RS) and a calibration request;
   receiving, by the central unit in response to the calibration request, a first uplink (UL) calibration RS and a first DL channel estimate associated with a first transmission point (TP) and a first wireless communication device;
   receiving, by the central unit in response to the calibration request, a second UL calibration RS and a third DL channel estimate based on the DL calibration RS, wherein the second UL calibration RS and the third DL channel estimate are associated with the first TP and a second wireless communication device; and
   transmitting, by the central unit, a DL coordinated multipoint (CoMP) joint transmission signal according to an uplink-downlink (UL-DL) reciprocity calibration, wherein the UL-DL reciprocity calibration is based on at least a first UL channel estimate based on the first UL calibration RS, the first DL channel estimate, a second UL channel estimate associated with a second TP and the first wireless communication device, a second DL channel estimate associated with the second TP and the first wireless communication device, the second UL calibration RS, and the third DL channel estimate associated with the first TP and the second wireless communication device.

2. The method of claim 1, wherein the UL-DL reciprocity calibration includes one or more calibration coefficients for adjusting the first UL channel estimate to more closely match the first DL channel estimate.

3. The method of claim 1, further comprising determining, by the central unit, the UL-DL reciprocity calibration by:
   determining a DL channel matrix based on the first DL channel estimate and the second DL channel estimate;
   determining a UL channel matrix based on the first UL channel estimate and the second UL channel estimate; and
   computing one or more calibration coefficients for adjusting the UL channel matrix, wherein a difference between the DL channel matrix and the UL channel matrix as adjusted by the one or more calibration coefficients is reduced.

4. The method of claim 1, further comprising receiving, by the central unit, a sounding reference signal (SRS) associated with the first wireless communication device, wherein the DL CoMP joint transmission signal is further based on the SRS.

5. The method of claim 1, wherein the calibration request is directed to the first wireless communication device, and wherein the first DL channel estimate is based on the DL calibration RS.

6. The method of claim 1, wherein the calibration request is directed to a plurality of wireless communication devices including the first wireless communication device and the second wireless communication device.

7. The method of claim 1, further comprising selecting, by the central unit, the first wireless communication device for the UL-DL reciprocity calibration from among a plurality of wireless communication devices based on a link quality of the first wireless communication device to at least the first TP.

8. The method of claim 1, wherein the central unit is positioned remote from the first TP.

9. The method of claim 1, wherein the central unit is collocated with the first TP.

10. A method of wireless communication, comprising:
receiving, by a user equipment (UE) from a first transmission point (TP), a first downlink (DL) calibration reference signal (RS) and a calibration request;
determining, by the UE, a first DL channel estimate based on the first DL calibration RS;
determining, by the UE, whether a communication link between the UE and the first TP satisfies a calibration rule;
transmitting, by the UE to the first TP in response to the calibration request, a first uplink (UL) calibration RS and the first DL channel estimate to facilitate an uplink-downlink (UL-DL) reciprocity calibration when the communication link between the UE and the first TP is determined to satisfy the calibration rule; and
receiving, by the UE, a DL coordinated multipoint (CoMP) joint transmission signal transmitted according to the UL-DL reciprocity calibration.

11. The method of claim 10, further comprising:
receiving, by the UE from a second TP, a second DL calibration RS;
determining, by the UE, a second DL channel estimate based on the second DL calibration RS; and
transmitting, by the UE to the second TP, a second UL calibration RS and the second DL channel estimate to facilitate the UL-DL reciprocity calibration.

12. The method of claim 11, wherein the DL CoMP joint transmission signal is received from the first TP and the second TP.

13. The method of claim 10, wherein the receiving the first DL calibration RS includes receiving a DL multiplexed signal carrying a second DL calibration RS associated with a second TP and the first DL calibration RS, wherein the method further comprises determining, by the UE, a second DL channel estimate based on the second DL calibration RS, and wherein the transmitting the first UL calibration RS and the first DL channel estimate includes transmitting a UL multiplexed signal carrying the first UL calibration RS, the first DL channel estimate, and the second DL channel estimate.

14. The method of claim 10, further comprising transmitting, by the UE to the first TP, a sounding reference signal (SRS), wherein the received DL CoMP joint transmission signal is based in part on the SRS.

15. An apparatus comprising:
a receiver configured to:
receive a first uplink (UL) calibration reference signal (RS) and a first DL channel estimate associated with a first transmission point (TP) and a first wireless communication device; and
receive a second UL calibration RS and a third DL channel estimate based on the DL calibration RS, wherein the second UL calibration RS and the third DL channel estimate are associated with the first TP and a second wireless communication device; and
a transmitter configured to:
transmit a downlink (DL) calibration reference signal (RS) and a calibration request, wherein the first UL calibration RS, the first DL channel estimate, the second UL calibration RS, and the third DL channel estimate are received in response to the calibration request; and
transmit a DL coordinated multipoint (CoMP) joint transmission signal according to an uplink-downlink (UL-DL) reciprocity calibration, wherein the UL-DL reciprocity calibration is based on at least a first UL channel estimate based on the first UL calibration RS, the first DL channel estimate, a second UL channel estimate associated with a second TP and the first wireless communication device, a second DL channel estimate associated with the second TP and the first wireless communication device, the second UL calibration RS, and the third DL channel estimate.

16. The apparatus of claim 15, wherein the UL-DL reciprocity calibration includes one or more calibration coefficients for adjusting the first UL channel estimate to more closely match the first DL channel estimate.

17. The apparatus of claim 15, further comprising a processor configured to determine the UL-DL reciprocity calibration by:
determining a DL channel matrix based on the first DL channel estimate and the second DL channel estimate;
determining a UL channel matrix based on the first UL channel estimate and the second UL channel estimate; and
computing one or more calibration coefficients for adjusting the UL channel matrix, wherein a difference between the DL channel matrix and the UL channel matrix as adjusted by the one or more calibration coefficients is reduced.

18. The apparatus of claim 15, wherein the receiver is further configured to receive a sounding reference signal (SRS) associated with the first wireless communication device, and wherein the DL CoMP joint transmission signal is further based on the SRS.

19. The apparatus of claim 15, wherein the calibration request is directed to the first wireless communication device, and wherein the first DL channel estimate is based on the DL calibration RS.

20. The apparatus of claim 15, wherein the calibration request is directed to a plurality of wireless communication devices including the first wireless communication device and the second wireless communication device.

21. The apparatus of claim 15, further comprising a processor configured to select the first wireless communication device for the UL-DL reciprocity calibration from among a plurality of wireless communication devices based on a link quality of the first wireless communication device to at least the first TP.

22. The apparatus of claim 15, wherein the apparatus is positioned remote from the first TP.

23. The apparatus of claim 15, wherein the apparatus is collocated with the first TP.

24. An apparatus comprising:
a receiver configured to:
   receive, from a first transmission point (TP), a first downlink (DL) calibration reference signal (RS) and a calibration request; and
   receive a DL coordinated multipoint (CoMP) joint transmission signal transmitted according to an uplink-downlink (UL-DL) reciprocity calibration;
a processor configured to:
   determine a first DL channel estimate based on the first DL calibration RS; and
   determine whether a communication link between the apparatus and the first TP satisfies a calibration rule; and
a transmitter configured to transmit, to the first TP in response to the calibration request, a first uplink (UL) calibration RS and the first DL channel estimate to facilitate the UL-DL reciprocity calibration when the communication link between the apparatus and the first TP is determined to satisfy the calibration rule.

25. The apparatus of claim 24, wherein the receiver is further configured to receive, from a second TP, a second DL calibration RS, wherein the processor is further configured to determine a second DL channel estimate based on the second DL calibration RS, and wherein the transmitter is further configured to transmit, to the second TP, a second UL calibration RS and the second DL channel estimate to facilitate the UL-DL reciprocity calibration.

26. The apparatus of claim 25, wherein the DL CoMP joint transmission signal is received from the first TP and the second TP.

27. The apparatus of claim 24, wherein the receiver is further configured to receive the first DL calibration RS by receiving a DL multiplexed signal carrying a second DL calibration RS associated with a second TP and the first DL calibration RS, wherein the processor is further configured to determine a second DL channel estimate based on the second DL calibration RS, and wherein the transmitter is further configured to transmit the first UL calibration RS and the first DL channel estimate by transmitting a UL multiplexed signal carrying the first UL calibration RS, the first DL channel estimate, and the second DL channel estimate.

28. The apparatus of claim 24, wherein the transmitter is further configured to transmit, to the first TP, a sounding reference signal (SRS), and wherein the received DL CoMP joint transmission signal is based in part on the SRS.

* * * * *